United States Patent
Yamaguchi et al.

(10) Patent No.: US 9,037,863 B2
(45) Date of Patent: *May 19, 2015

(54) TERMINAL DEVICE, SERVER DEVICE, CONTENT RECORDING CONTROL SYSTEM, RECORDING METHOD, AND RECORDING PERMISSION CONTROL METHOD

(71) Applicant: Panasonic Corporation, Osaka (JP)

(72) Inventors: Takahiro Yamaguchi, Osaka (JP); Yuichi Futa, Ishikawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,122

(22) Filed: Mar. 25, 2014

(65) Prior Publication Data

US 2014/0237624 A1 Aug. 21, 2014

Related U.S. Application Data

(63) Continuation of application No. 13/490,866, filed on Jun. 7, 2012, now Pat. No. 8,726,030.

(60) Provisional application No. 61/496,188, filed on Jun. 13, 2011.

(51) Int. Cl.
*H04L 9/28* (2006.01)
*G06F 7/04* (2006.01)
(Continued)

(52) U.S. Cl.
CPC .............. *G06F 21/10* (2013.01); *H04L 9/0825* (2013.01); *H04L 2209/605* (2013.01);
(Continued)

(58) Field of Classification Search
None
See application file for complete search history.

(56) References Cited

U.S. PATENT DOCUMENTS 6,859,790 B1 2/2005 Nonaka et al.
7,110,984 B1 9/2006 Spagna et al.
(Continued)

FOREIGN PATENT DOCUMENTS

| JP | 2001-127988 | 5/2001 |
| JP | 2006-209705 | 8/2006 |

(Continued)

OTHER PUBLICATIONS

International Search Report issued Aug. 7, 2012 in corresponding International Application No. PCT/JP2012/003655.

(Continued)

*Primary Examiner* — Christopher Revak
(74) *Attorney, Agent, or Firm* — Wenderoth, Lind & Ponack, L.L.P.

(57) ABSTRACT

A terminal device recording content onto a recording medium device, a permission to record the content onto the recording medium device being granted by a server device, the terminal device comprising: a generation unit generating a value calculated so as to represent subject content for which permission to record is requested; an information transmission unit requesting the permission from the server device by transmitting information indicating the value generated by the generation unit to the server device; a signature reception unit receiving subject content signature data from the server device, the subject content signature data being transmitted by the server device upon granting the permission; and a recording unit recording the subject content onto the recording medium device as one of plain-text data and encrypted data, as well as the subject content signature data received by the signature reception unit.

6 Claims, 28 Drawing Sheets

(51) Int. Cl.

| | | |
|---|---|---|
| *G06F 21/10* | (2013.01) | |
| *H04L 9/08* | (2006.01) | |
| *H04N 5/913* | (2006.01) | |
| *H04N 21/254* | (2011.01) | |
| *H04N 21/433* | (2011.01) | |
| *H04N 21/658* | (2011.01) | |
| *H04N 21/8352* | (2011.01) | |
| *G11B 20/00* | (2006.01) | |

(52) U.S. Cl.
CPC .......... *H04N 5/913* (2013.01); *H04N 21/2541* (2013.01); *H04N 21/4334* (2013.01); *H04N 21/6581* (2013.01); *H04N 21/8352* (2013.01); H04N 2005/91328 (2013.01); H04N 2005/91364 (2013.01); *G11B 20/0021* (2013.01); *G11B 20/00855* (2013.01); *G11B 20/00086* (2013.01)

(56) References Cited

U.S. PATENT DOCUMENTS

| | | | |
|---|---|---|---|
| 7,203,312 B1 | 4/2007 | Hatanaka et al. | |
| 7,350,238 B2 | 3/2008 | Abe et al. | |
| 7,487,128 B2 | 2/2009 | Spagna et al. | |
| 7,587,503 B2 | 9/2009 | Sato et al. | |
| 7,650,359 B2 | 1/2010 | Sato et al. | |
| 7,891,010 B2 | 2/2011 | Kuriya et al. | |
| 7,933,870 B1 | 4/2011 | Webster | |
| 7,979,709 B2 | 7/2011 | Takashima et al. | |
| 7,984,296 B2 | 7/2011 | Watanabe et al. | |
| 8,364,597 B2 | 1/2013 | Ugawa et al. | |
| 8,726,030 B2 * | 5/2014 | Yamaguchi et al. | 713/176 |
| 2001/0047481 A1 | 11/2001 | Inoha et al. | |
| 2002/0055942 A1 * | 5/2002 | Reynolds | 707/200 |
| 2005/0066167 A1 | 3/2005 | Asano et al. | |
| 2006/0212697 A1 | 9/2006 | Sato et al. | |
| 2008/0021936 A1 * | 1/2008 | Reynolds | 707/203 |
| 2008/0134340 A1 * | 6/2008 | Ueda et al. | 726/26 |
| 2009/0202071 A1 | 8/2009 | Kato | |
| 2010/0054698 A1 | 3/2010 | Isozaki et al. | |
| 2010/0138934 A1 | 6/2010 | Minoshima | |
| 2010/0281263 A1 | 11/2010 | Ugawa et al. | |
| 2011/0087690 A1 | 4/2011 | Cairns | |
| 2012/0170913 A1 | 7/2012 | Isozaki et al. | |
| 2013/0061048 A1 | 3/2013 | Suu et al. | |
| 2013/0132727 A1 * | 5/2013 | Petrovic | 713/176 |
| 2013/0159723 A1 * | 6/2013 | Brandt et al. | 713/176 |

FOREIGN PATENT DOCUMENTS

| | | |
|---|---|---|
| JP | 2007-535189 | 11/2007 |
| JP | 2008-21350 | 1/2008 |
| JP | 2008-159233 | 7/2008 |
| JP | 2009-193623 | 8/2009 |
| JP | 2009-199490 | 9/2009 |
| JP | 2010-134578 | 6/2010 |
| WO | 2005/096119 | 10/2005 |
| WO | 2008/096543 | 8/2008 |

OTHER PUBLICATIONS

"Advanced Access Content System (AACS): Prepared Video Book", Revision 0.95, Feb. 19, 2009, pp. 1-33.

"Advanced Access Content System (AACS): Introduction and Common Cryptographic Elements", Revision 0.91, Feb. 17, 2006, pp. 1-70.

Invitation to Pay Additional Fees and, Where Applicable, Protest Fee (Form PCT/ISA/206), issued Jun. 26, 2012 in corresponding International Application No. PCT/JP2012/003655.

* cited by examiner

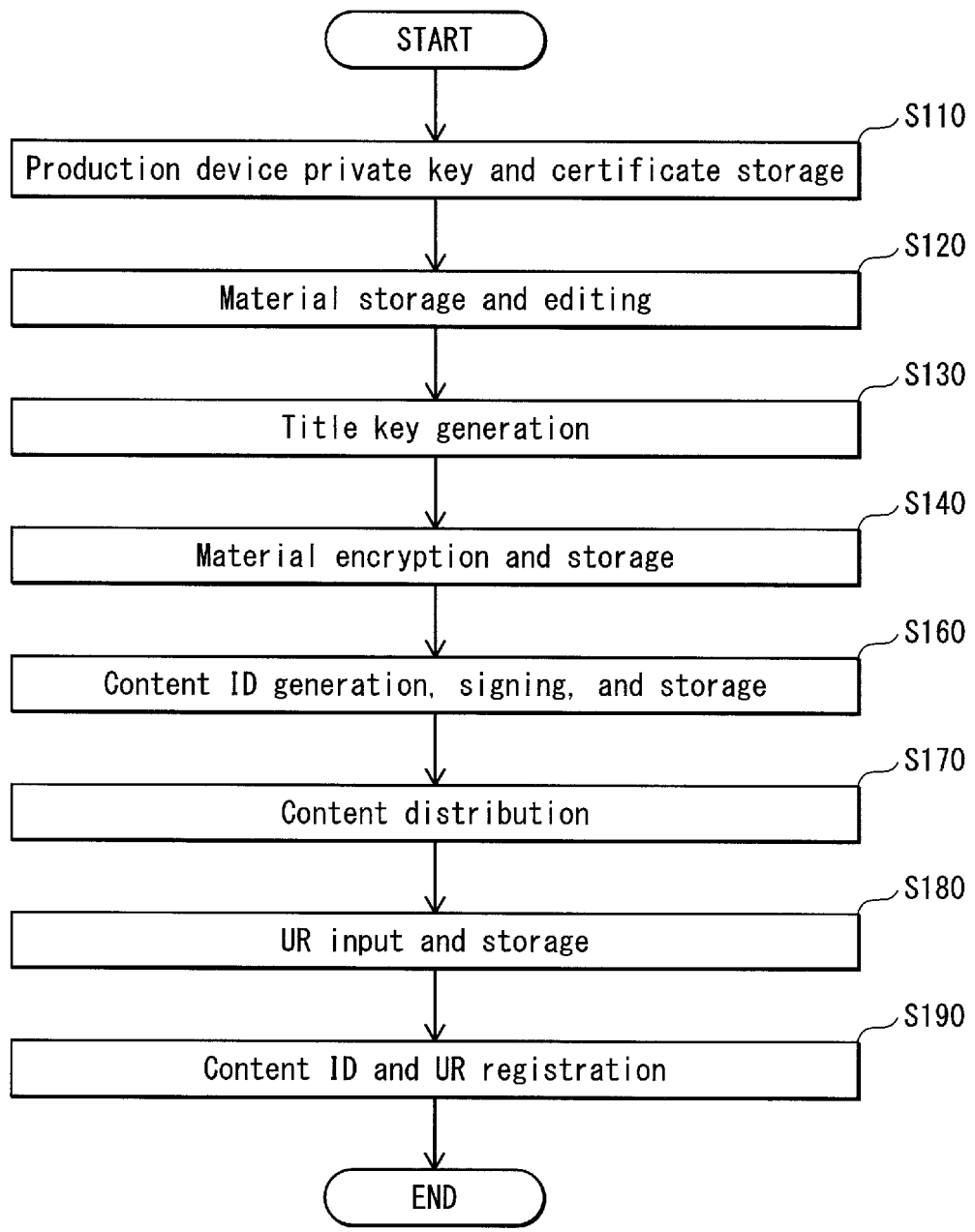

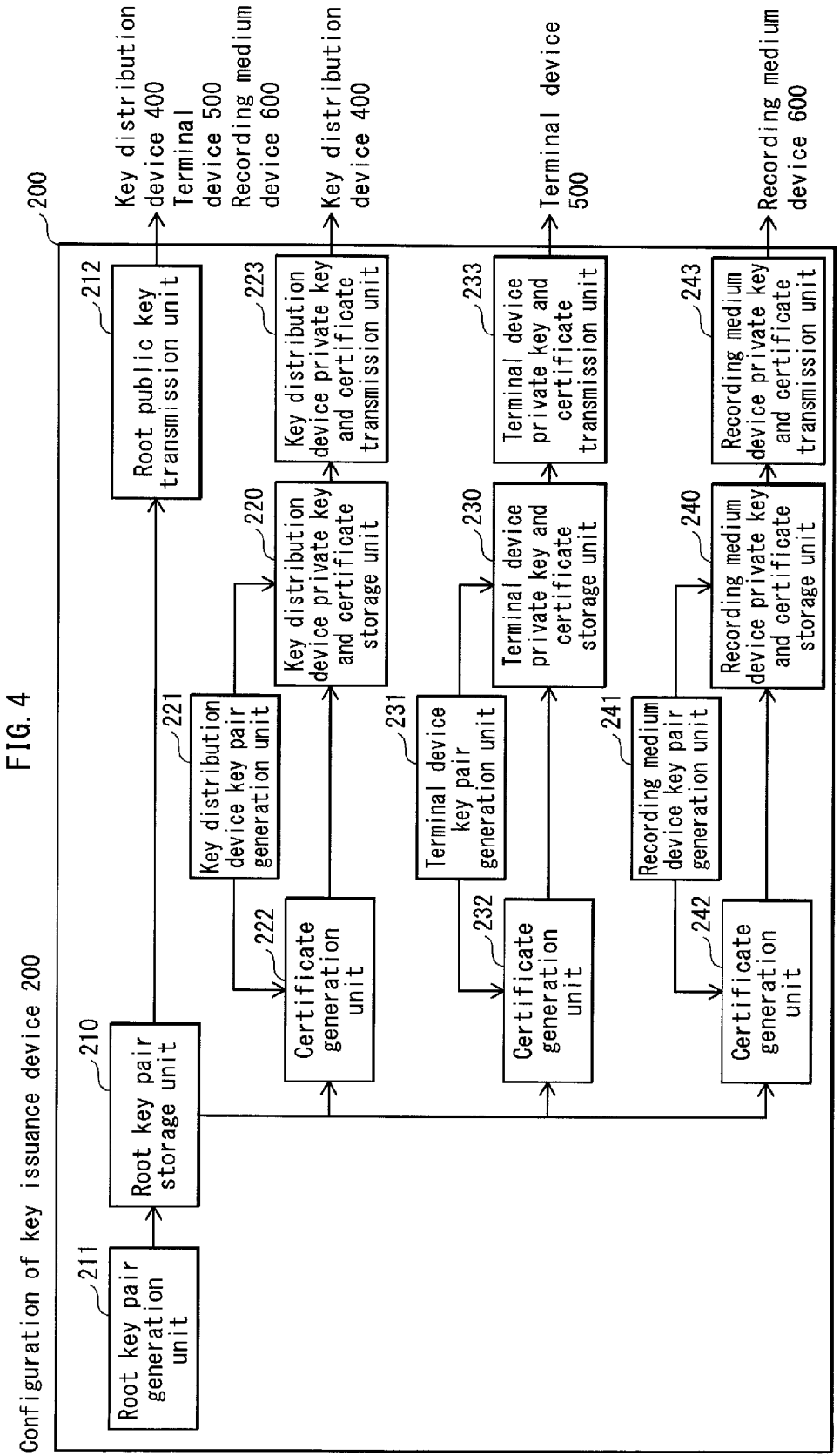

Writeout authentication request data

Writeout request data

Unsigned data

Signed data

Configuration of terminal device 500 (for playback)

TERMINAL DEVICE, SERVER DEVICE, CONTENT RECORDING CONTROL SYSTEM, RECORDING METHOD, AND RECORDING PERMISSION CONTROL METHOD

CROSS REFERENCE TO RELATED APPLICATION

This application is a continuation of U.S. application Ser. No. 13/490,866, filed Jun. 7, 2012, now U.S. Pat. No. 8,726,030, which claims benefit to the provisional U.S. Application 61/496,188, filed on Jun. 13, 2011.

TECHNICAL FIELD

The present disclosure pertains to content protection technology used when recording content onto a recording medium device.

DESCRIPTION OF THE RELATED ART

Advanced Access Content System (hereinafter, AACS) is known as copyright protection technology used for digital copyrighted works, such as movies and music. For example, AACS is used to protect content recorded on a Blu-Ray Disc™ (hereinafter, BD).

An AACS-compliant terminal device playing back the content reads out the content recorded on a BD-ROM (which is a read-only medium) along with a media key block (hereinafter, MKB) required to decrypt the content, then decrypts the content using the MKB in combination with a device key issued in advance. The terminal device is thus able to play back the content.

Incidentally, a need to copy or move (the term "copy" is hereinafter used to include move operations) content protected by AACS and acquired by the terminal device to a recording medium device (e.g., SD memory) may arise in the course of playing back the content on a different device.

CITATION LIST

Non-Patent Literature

[Non-Patent Literature 1]
Advanced Access Content System (AACS) Prepared Video Book Revision 0.95
[Non-Patent Literature 2]
Advanced Access Content System (AACS) Introduction and Common Cryptographic Elements Revision 0.91

SUMMARY

However, freely allowing such copying of the content leads to an inability to maintain copyright protection therefor.

In consideration of this problem, one non-limiting and exemplary Embodiment provides a terminal device capable of inhibiting the recording of non-permitted content, such as illegitimately duplicated content, onto a recording medium device.

In one general aspect, the technology here disclosed features a terminal device recording content onto a recording medium device, a permission to record the content onto the recording medium device being granted by a server device, the terminal device comprising: a generation unit generating a value calculated so as to represent subject content for which a permission to record onto the recording medium device is requested; an information transmission unit requesting the permission from the server device to record the subject content onto the recording medium device by transmitting information indicating the value generated by the generation unit to the server device; a signature reception unit receiving subject content signature data from the server device, the subject content signature data being transmitted by the server device upon granting the permission to record the subject content onto the recording medium device; and a recording unit recording the subject content onto the recording medium device as one of plain-text data and encrypted data, as well as the subject content signature data received by the signature reception unit.

According to the terminal device pertaining to the above aspect, only content for which a permission to record has been granted by the server device is recordable onto the recording medium device, thus inhibiting the recording of illegitimately duplicated content.

These general and specific aspects may be implemented using a system, a method, and a computer program, and any combination of systems, methods, and computer programs.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 3 is a flowchart of a content production process by the content production device 100 pertaining to the exemplary Embodiment.

FIG. 4 is a block diagram illustrating the principal functional configuration of a key issuance device 200 pertaining to the exemplary Embodiment.

DETAILED DESCRIPTION

The following describes a content distribution system 1000, including a key distribution device and a terminal device, as an exemplary Embodiment of a content recording management system, made up of a server device and a terminal device, pertaining to the present disclosure.

Exemplary Embodiment (Outline)

In order to, for example, play back content protected by AACS and acquired by the terminal device on a device other than the terminal device, the content may be copied onto a recording medium device (e.g., SD memory) using non-AACS copyright protection technology.

Plausible methods for accomplishing such copying onto the recording medium device include, for example, having the terminal device decrypt the AACS-protected content (i.e., encrypted content) to acquire plain-text content, encrypt the plain-text content using a method conforming to the non-AACS copyright protection technology, and then write the result to the recording medium device.

However, this method involves granting the terminal device processing privileges pertaining to content protection. In the event that the terminal device is hacked, there is a risk that content may be recorded onto the recording medium device without protection and thus be illicitly duplicated.

In consideration of this issue, the present disclosure has the key distribution device determine whether or not to grant the terminal device a permission to record the content onto the recording medium device, and generates signed data only when the permission is granted. The terminal device then records the signed data so generated with the content on the recording medium device. Also, a legitimate playback device is unable to play back the content unless the signed data are also recorded. Thus, the legitimate playback device is unable to play back content recorded alone onto the recording medium device by a hacked terminal device.

Accordingly, the recording of illicitly duplicated content and similar disallowed content onto the recording medium device in playable form is inhibited.

(System Configuration)

Figure 1:
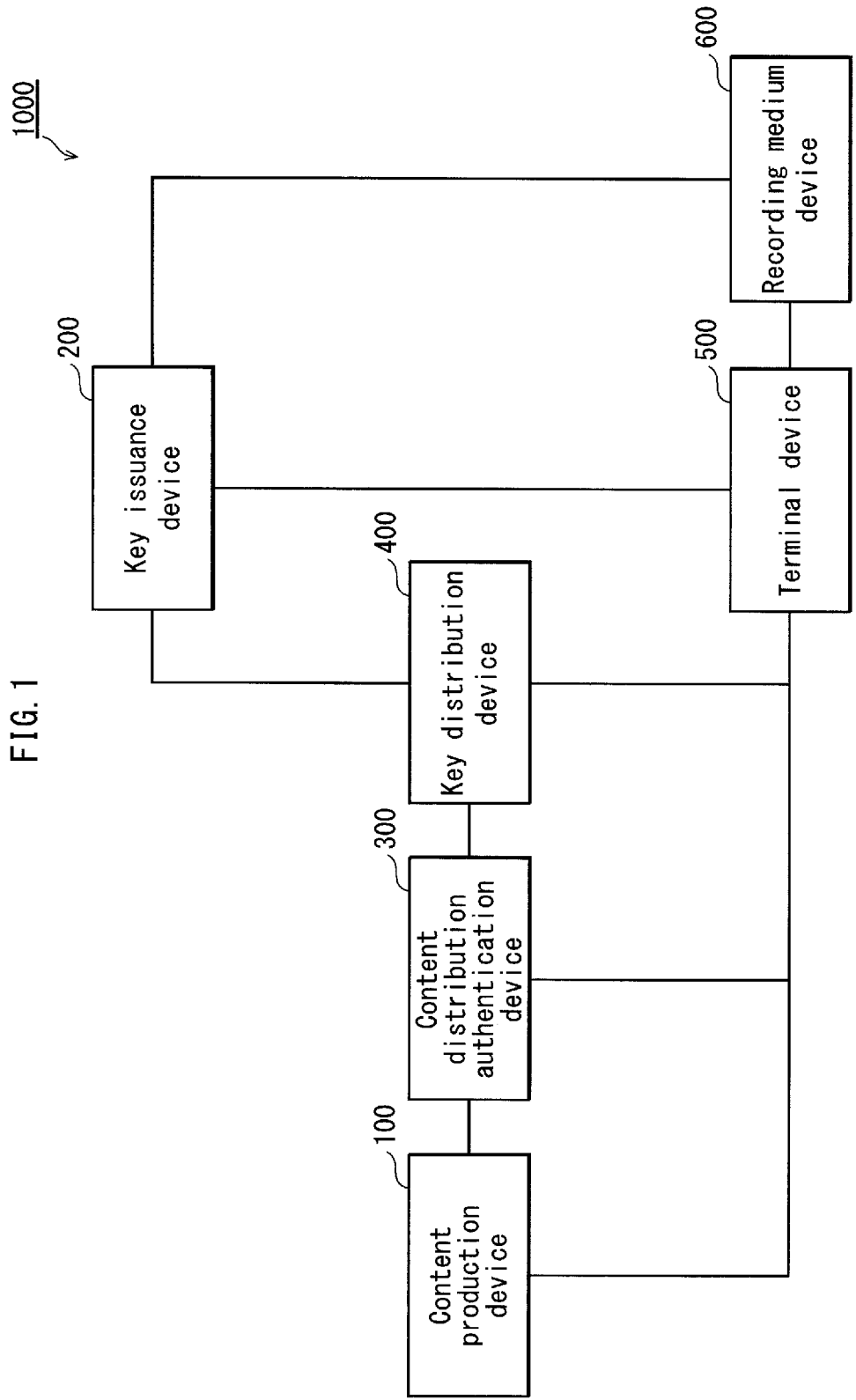
FIG. 1 is a block diagram illustrating the system configuration of a content distribution system 1000 pertaining to an exemplary Embodiment.

FIG. 1 is a block diagram illustrating the system configuration of a content distribution system 1000 pertaining to the exemplary Embodiment.

The content distribution system 1000 is made up of a content production device 100, a key issuance device 200, a content distribution authentication device 300, a key distribution device 400, a terminal device 500, and a recording medium device 600.

The terminal device 500 is, for example, a DVD or BD player capable of playing back a recording medium, such as a DVD, BD, or similar optical disc, is able to connect to a network, and is installed in a user's home or the like for content viewing purposes. The recording medium device 600 is an SD card or similar memory card usable by insertion into a card slot on the terminal device 500. The content distribution authentication device 300 corresponds to the AACS managed copy authentication server used in AACS.

The content production device 100 and the content distribution authentication device 300 are connected via a network, as are the key issuance device 200 and the key distribution device 400, and the content distribution authentication device 300, the key distribution device 400, and the terminal device 500.

(Configuration of Content Production Device 100)

Figure 2:
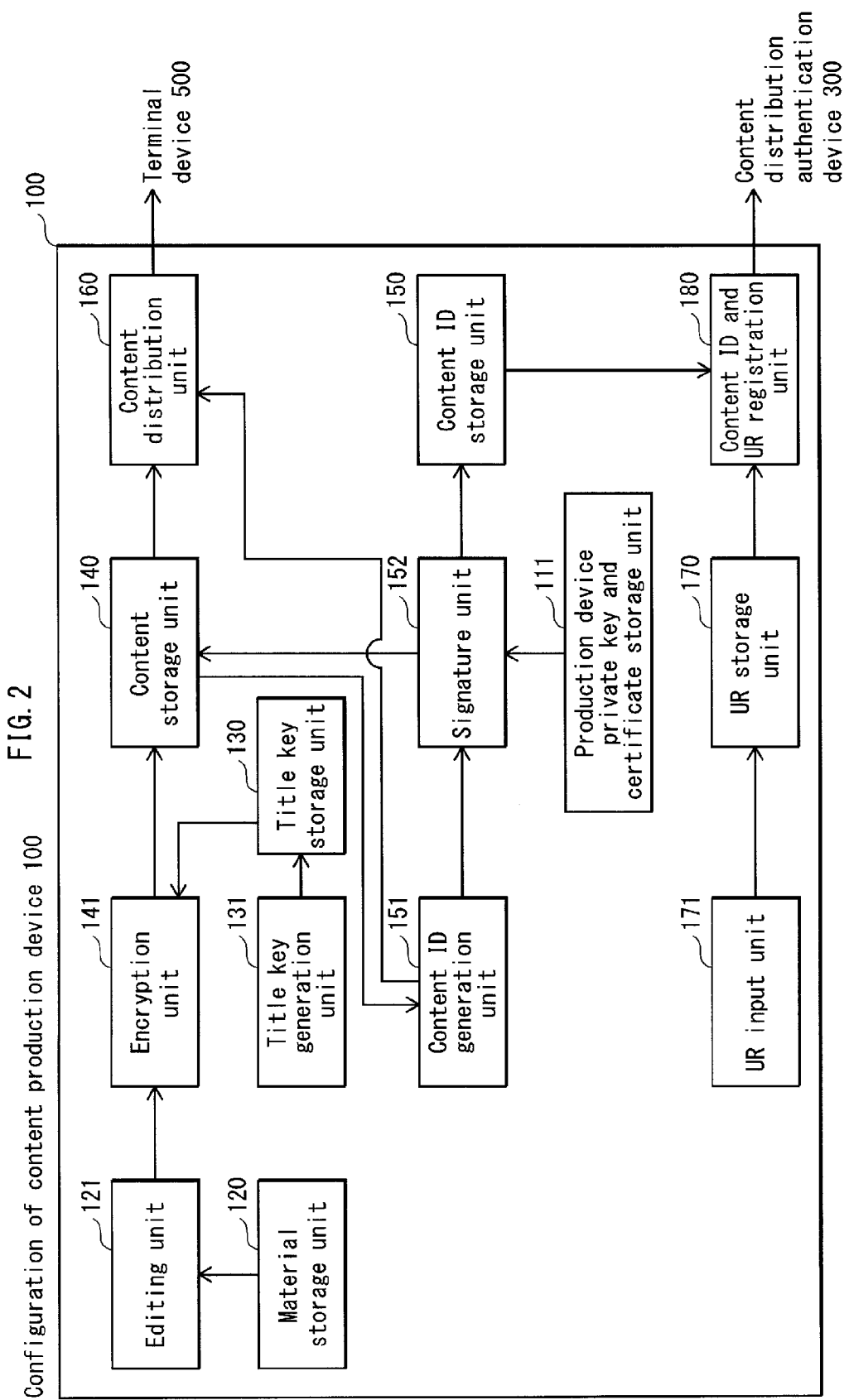
FIG. 2 is a block diagram illustrating the principal functional configuration of a content production device 100 pertaining to the exemplary Embodiment.

FIG. 2 is a block diagram illustrating the functional configuration of the principal components of the content production device 100.

As shown, the content production device 100 includes a content production device private key and certificate storage unit 111, a material storage unit 120, an editing unit 121, a title key storage unit 130, a title key generation unit 131, a content storage unit 140, an encryption unit 141, a content ID storage unit 150, a content ID generation unit 151, a signature unit 152, a content distribution unit 160, a UR storage unit 170, a UR input unit 171, and a content ID and UR registration unit 180.

The content production device 100 includes a processor, memory, and a network interface card (hereinafter, NIC). The functions of the editing unit 121, the title key generation unit 131, the encryption unit 141, the content ID generation unit 151, and the signature unit 152 are each realized by having the processor execute a program stored in the memory. Data transmission by the content ID and UR registration unit 180 is performed using the NIC.

The content production device private key and certificate storage unit 111 is a memory area for storing a content production device private key and a paired content production device certificate. The details of the writing process for the content production device private key and certificate are omitted.

The material storage unit 120 is a memory area for storing audiovisual materials for a movie or similar. The production method for the audiovisual materials themselves is omitted.

The editing unit 121 edits the materials stored in the material storage unit 120, then outputs the edited materials to the encryption unit 141.

The title key storage unit 130 is a memory area for storing a title key.

The title key generation unit 131 generates the title key for storage in the title key storage unit 130. The title key is, for example, a 128-bit random number.

The content storage unit 140 is a memory area for storing encrypted content. Unless otherwise specified, encrypted content is hereinafter referred to as content, while unencrypted content is referred to as plain-text content.

The encryption unit 141 encrypts the materials output from the editing unit 121 using the title key stored in the title key storage unit 130 to generate content for storage in the content storage unit 140.

The content ID storage unit 150 is a memory area for storing a content ID having a signature.

The content ID generation unit 151 generates the content ID for identifying the content according to the content stored in the content storage unit 140, and then outputs the content ID to the signature unit 152. The content ID may be any information identifying the content, and may be generated as follows, for example. In effect, the content is divided into a plurality of portions, a hash value is calculated for each portion, and a hash table is generated from the hash values so calculated. Furthermore, a hash value is calculated for the hash table, and this hash value is usable as the content ID. In the BD example, the CCID, which is a portion of the Content Cert specified in AACS, may be used as the content ID.

The signature unit 152 signs the content ID output by the content ID generation unit 151 using the content production device private key stored in the content production device private key and certificate storage unit 111 and stores the result in the content ID storage unit 150.

The content distribution unit 160 distributes the content stored in the content storage unit 140 and the hash table and so on generated during the generation process by the content ID generation unit 151 to the terminal device 500. No particular limitation is intended regarding the method of distribution to the terminal device 500. However, in the exemplary Embodiment, the content distribution unit 160 records the content and so on onto a recording medium such as a DVD, BD, or similar optical disc. Then, the recording medium on which the content is recorded is sold through a physical market and thus distributed to the terminal device 500 installed in the user's home. The aforementioned hash table is used for content verification by the terminal device 500 playing back the content recorded and distributed on the optical disc or the like. In the AACS example, at playback time, the terminal device calculates hash values for seven randomly-selected points within each of the pieces of content. The playback device then compares the hash value so calculated to hash values for the corresponding portions listed in the distributed hash table, such that playback is permitted when all seven portions match.

The UR storage unit 170 is a memory area for storing Usage Rules (hereinafter, UR), which are conditions for content playback and copying.

The UR input unit 171 includes a keyboard or similar input device, receives UR input from the operator or the like of the content production device 100, and stores the UR in a predetermined format in the UR storage unit 170.

The content ID and UR registration unit 180 registers the content ID stored in the content ID storage unit 150 and the UR stored in the UR storage unit 170 through transmission via the network to the content distribution authentication device 300.

(Production Process for Content Production Device 100)

FIG. 3 is a flowchart indicating the content production process by the content production device 100.

The order of operations given below as steps S110 through S190 is an example of the content production processing. For example, provided that step S110 is completed before S160 begins, steps S120 and S130 are completed before step S140 begins, and steps S160 and S180 are completed before step S190 begins, the ordering of the steps is not limited to that given below.

As indicated, the content production device private key and paired certificate are stored in the content production device private key and certificate storage unit 111 (step S110).

The editing unit 121 edits the materials stored in the material storage unit 120 (step S120). The title key generation unit 131 generates a title key for storage in the title key storage unit 130 (step S130).

The encryption unit 141 encrypts the materials edited by the editing unit 121 with the title key stored in the title key storage unit 130 to generate content for storage in the content storage unit 140 (step S140).

The content ID generation unit 151 generates the content ID according to the content stored in the content storage unit 140. Also, the signature unit 152 signs the content ID generated by the content ID generation unit 151, then stores the signed content ID in the content ID storage unit 150 (step S160).

The content distribution unit 160 distributes the content stored in the content storage unit 140 and the hash values and so on generated during the generation process by the content ID generation unit 151 to the terminal device 500 (step S170).

The UR input unit 171 receives the UR input from the operator or similar of the content production device 100 for storage in the UR storage unit 170 (step S180). Also, the content ID and UR registration unit 180 registers and transmits the content ID stored in the content ID storage unit 150 paired with the UR stored in the UR storage unit 170 through transmission to the content distribution authentication device 300 (step S190). The content production device 100 then concludes the content production process.

(Configuration of Key Issuance Device 200)

FIG. 4 is a block diagram illustrating the principal functional configuration of the key issuance device 200.

As shown, the key issuance device 200 includes a root key pair storage unit 210, a root key pair generation unit 211, a root public key transmission unit 212, a key distribution device private key and certificate storage unit 220, a key distribution device key pair generation unit 221, a certificate generation unit 222, a key distribution device private key and certificate transmission unit 223, a terminal device private key and certificate storage unit 230, a terminal device key pair generation unit 231, a certificate generation unit 232, a terminal device private key and certificate transmission unit 233, a recording medium device private key and certificate storage unit 240, a recording medium device key pair generation unit 241, a certificate generation unit 242, and a recording medium device private key and certificate transmission unit 243.

The key issuance device 200 includes a processor, memory, and a NIC. The functions of the root key pair generation unit 211, the key distribution device key pair generation unit 221, certificate generation unit 222, the terminal device key pair generation unit 231, certificate generation unit 232, the recording medium device key pair generation unit 241, and certificate generation unit 242 are each realized by having the processor execute a program stored in the memory. Also, data transmission by the root public key transmission unit 212, the key distribution device private key and certificate transmission unit 223, the terminal device private key and certificate transmission unit 233, and the recording medium device private key and certificate transmission unit 243 is performed using the NIC.

The root key pair storage unit 210 is a memory area for storing a pair of keys made up of the root public key and the root private key for the key issuance device 200. The root private key serves as the foundation of security in the content distribution system 1000 pertaining to the exemplary Embodiment.

The root key pair generation unit 211 generates the pair of keys, made up of the root public key and the root private key for the key issuance device 200, for storage in the root key pair storage unit 210.

The root public key transmission unit 212 transmits the root public key stored in the root key pair storage unit 210 via the network to the key distribution device 400, the terminal device 500, and the recording medium device 600.

The key distribution device private key and certificate storage unit 220 is a memory area for storing a key distribution device private key and paired certificate.

The key distribution device key pair generation unit 221 generates the pair of keys, made up of the key distribution device public key and private key, for the key distribution device 400, outputs the key distribution device public key so generated to the certificate generation unit 222, and stores the key distribution device private key so generated in the key distribution device private key and certificate storage unit 220.

The certificate generation unit 222 uses the root private key stored in the root key pair storage unit 210 to sign the key distribution device public key and the like output by the key distribution device key pair generation unit 221, thus generating a key distribution device certificate 10 for storage in the key distribution device private key and certificate storage unit 220.

The following describes the key distribution device certificate 10.

Figure 5A:
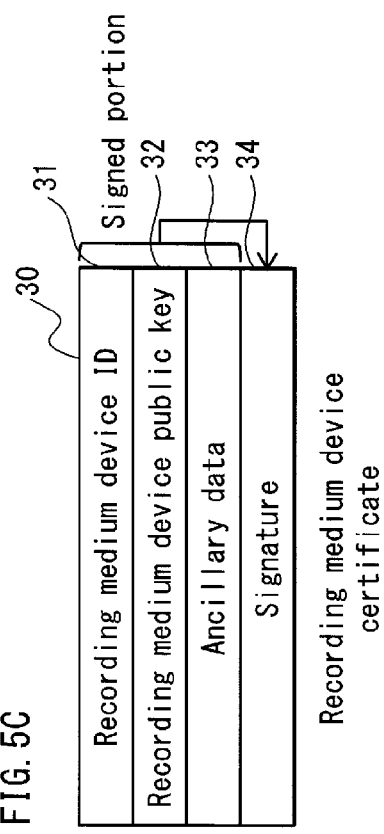
FIGS. 5A, 5B and 5C illustrate a data configuration example and sample content for a key distribution device certificate 10, a terminal device certificate 20, and a recording medium device certificate 30, each generated by the key issuance device 200 pertaining to the exemplary Embodiment.

FIG. 5A is a diagram illustrating the data configuration and sample content of the key distribution device certificate 10.

As shown, the key distribution device certificate 10 is made up of a key distribution device ID 11, the key distribution device public key 12, ancillary data 13, and a signature 14.

The key distribution device ID 11 is the ID of the key distribution device 400, the key distribution device public key 12 is the key distribution device public key generated by the key distribution device key pair generation unit 221, and the ancillary data 13 are, for example, data indicating the issuance or expiration date of the key distribution device certificate 10. Also, the signature 14 is the signature generated by the certificate generation unit 222 for the key distribution device ID 11, the key distribution device public key 12, and the ancillary data 13.

The key distribution device private key and certificate transmission unit 223 transmits the key distribution device private key and paired certificate 10 stored in the key distribution device private key and certificate storage unit 220 via the network to the key distribution device 400.

The terminal device private key and certificate storage unit 230 is a memory area for storing a terminal device private key and paired certificate 20.

The terminal device key pair generation unit 231 generates the pair of keys, made up of the terminal device public key and private key, for the terminal device 500, outputs the terminal device public key so generated to the certificate generation unit 232, and stores the terminal device private key so generated in the terminal device private key and certificate storage unit 230.

The certificate generation unit 232 uses the root private key stored in the root key pair storage unit 210 to sign the terminal device public key and so on output by the terminal device key pair generation unit 231, thus generating the terminal device certificate 20 for storage in the terminal device private key and certificate storage unit 230.

The following describes the terminal device certificate 20.

Figure 5C:
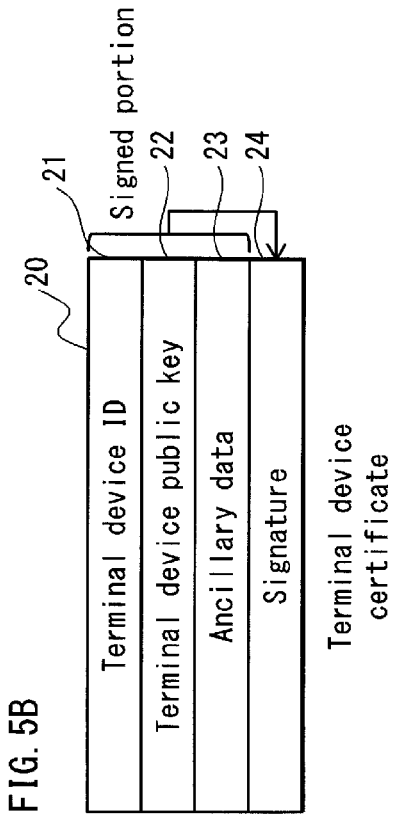
Figure 5B:
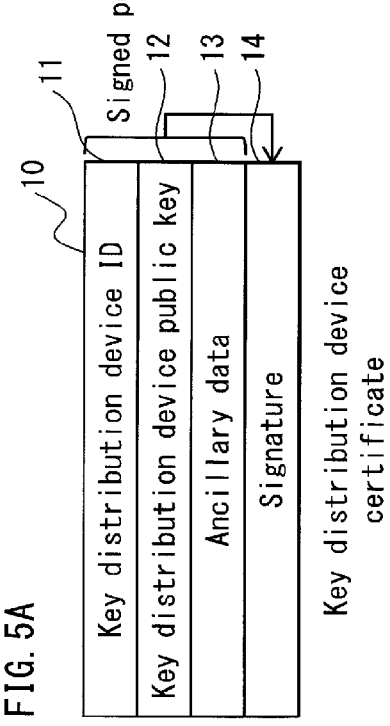

FIG. 5B is a diagram illustrating a data configuration example and sample content of the terminal device certificate 20.

As shown, the terminal device certificate 20 is made up of a terminal device ID 21, the terminal device public key 22, ancillary data 23, and a signature 24.

The terminal device ID 21 is the ID of the terminal device 500, the terminal device public key 22 is the terminal device public key generated by the terminal device key pair generation unit 231, and the ancillary data 23 are, for example, data indicating the issuance or expiration date of the terminal device certificate 20. Also, the signature 24 is the signature generated by the certificate generation unit 232 for the terminal device ID 21, the terminal device public key 22, and the ancillary data 23.

The terminal device private key and certificate transmission unit 233 transmits the terminal device private key and paired certificate 20 stored in the terminal device private key and certificate storage unit 230 via the network to the terminal device 500.

The recording medium device private key and certificate storage unit 240 is a memory area for storing a recording medium device private key and paired certificate 30.

The recording medium device key pair generation unit 241 generates the pair of keys, made up of the recording medium device private key and public key, for the recording medium device 600, outputs the recording medium device public key so generated to the certificate generation unit 242, and stores the recording medium device private key so generated in the recording medium device private key and certificate storage unit 240.

The certificate generation unit 242 uses the root private key stored in the root key pair storage unit 210 to sign the recording medium device public key and so on output by the recording medium device key pair generation unit 241, thus generating a recording medium device certificate 30 for storage in the recording medium device private key and certificate storage unit 240.

The following describes the recording medium device certificate 30.

FIG. 5C is a diagram illustrating a data configuration example and sample content for the recording medium device certificate 30.

As shown, the recording medium device certificate 30 is made up of a recording medium device ID 31, the recording medium device public key 32, ancillary data 33, and a signature 34.

The recording medium device ID 31 is the ID of the recording medium device 600, the recording medium device public key 32 is the recording medium device public key generated by the recording medium device key pair generation unit 241, and the ancillary data 33 are, for example, data indicating the issuance or expiration date of the recording medium device certificate 30. Also, the signature 34 is the signature generated by the certificate generation unit 242 for the recording medium device ID 31, the recording medium device public key 32, and the ancillary data 33.

The recording medium device private key and certificate transmission unit 243 transmits the recording medium device private key and paired certificate 30 stored in the recording medium device private key and certificate storage unit 240 via the network to the recording medium device 600.

(Key Issuance Process by Key Issuance Device 200)

Figure 6:
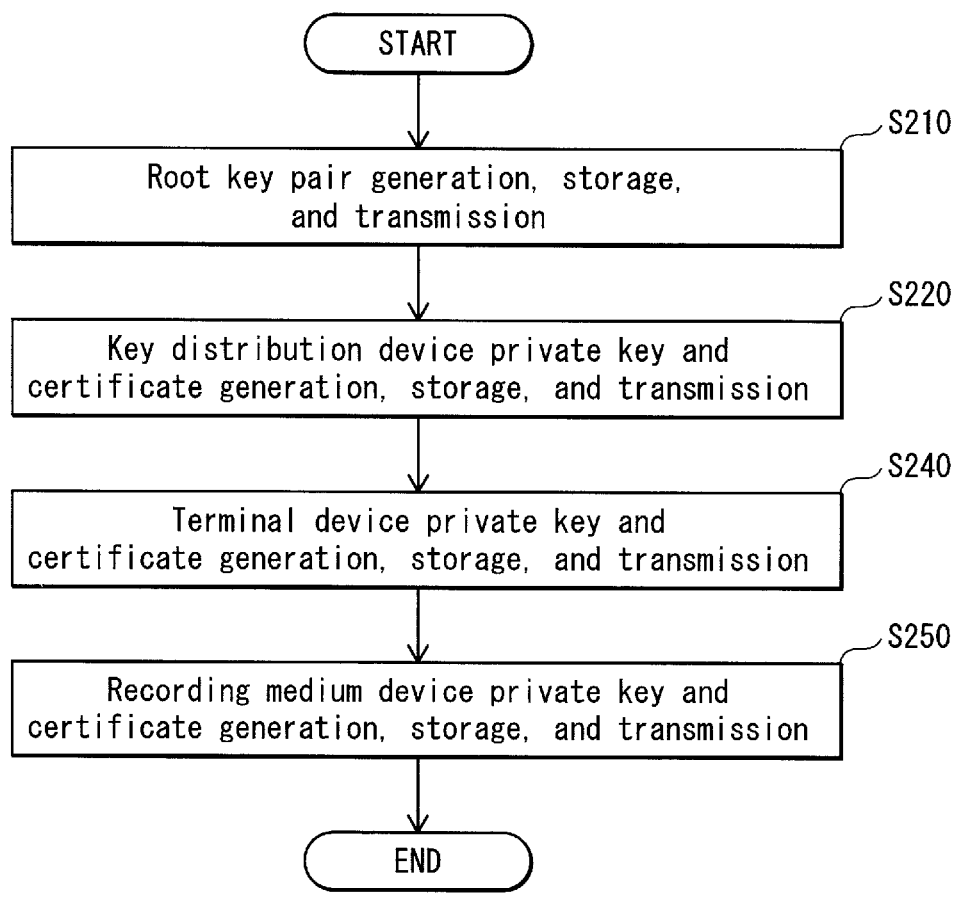
FIG. 6 is a flowchart indicating a key issuance process by the key issuance device 200 pertaining to the exemplary Embodiment.

FIG. 6 is a flowchart indicating the key issuance operations of the key issuance device 200.

The order of operations given below as steps S210 through S250 is an example of the key issuance processing. For example, any of steps S220, S240, and S250 may begin provided that step S210 has been completed. Also, steps S220, S240, and S250 may be completed in any order, provided that step S210 is completed beforehand. No limitation is intended regarding the order of steps S220, S240, and S250. That is, steps S220 and S250 may occur after step S240 in the stated order or the opposite, and steps S220 and S240 may likewise occur after step S250 in the stated order or the opposite.

The root key pair generation unit 211 of the key issuance device 200 generates the pair of keys made up of the root public key and the root private key for storage in the root key pair storage unit 210. The root public key transmission unit 212 transmits the root public key so generated to the key distribution device 400, the terminal device 500, and the recording medium device 600 (step S210).

The key distribution device key pair generation unit 221 generates the pair of keys, made up of the key distribution device public key and private key, and stores the key distribution device private key so generated in the key distribution device private key and certificate storage unit 220. The certificate generation unit 222 uses the root private key stored in the root key pair storage unit 210 to sign the key distribution device public key and the like generated by the key distribution device key pair generation unit 221, thus generating a key distribution device certificate 10 for storage in the key distribution device private key and certificate storage unit 220. Also, the key distribution device private key and certificate transmission unit 223 transmits the key distribution device private key and paired certificate 10 stored in the key distribution device private key and certificate storage unit 220 to the key distribution device 400 (step S220).

The terminal device key pair generation unit 231 generates the pair of keys, made up of the terminal device public key and private key, and stores the terminal device private key so generated in the terminal device private key and certificate storage unit 230. Also, the certificate generation unit 232 uses the root private key stored in the root key pair storage unit 210 to sign the terminal device public key and so on generated by the terminal device key pair generation unit 231, thus generating the terminal device certificate 20 for storage in the terminal device private key and certificate storage unit 230. The terminal device private key and certificate transmission unit 233 transmits the terminal device private key and paired certificate 20 stored in the terminal device private key and certificate storage unit 230 to the terminal device 500 (step S240).

The recording medium device key pair generation unit 241 generates the pair of keys, made up of the recording medium device private key and public key, and stores the recording medium device private key so generated in the recording medium device private key and certificate storage unit 240. Also, the certificate generation unit 242 uses the root private key stored in the root key pair storage unit 210 to sign the recording medium device public key and so on generated by the recording medium device key pair generation unit 241, thus generating a recording medium device certificate 30 for storage in the recording medium device private key and certificate storage unit 240. The recording medium device private key and certificate transmission unit 243 transmits the recording medium device private key and paired certificate 30 stored in the recording medium device private key and certificate storage unit 240 to the recording medium device 600 (step S250). The key issuance device 200 then concludes the key issuance process.

(Configuration of Content Distribution Authentication Device 300)

Figure 7:
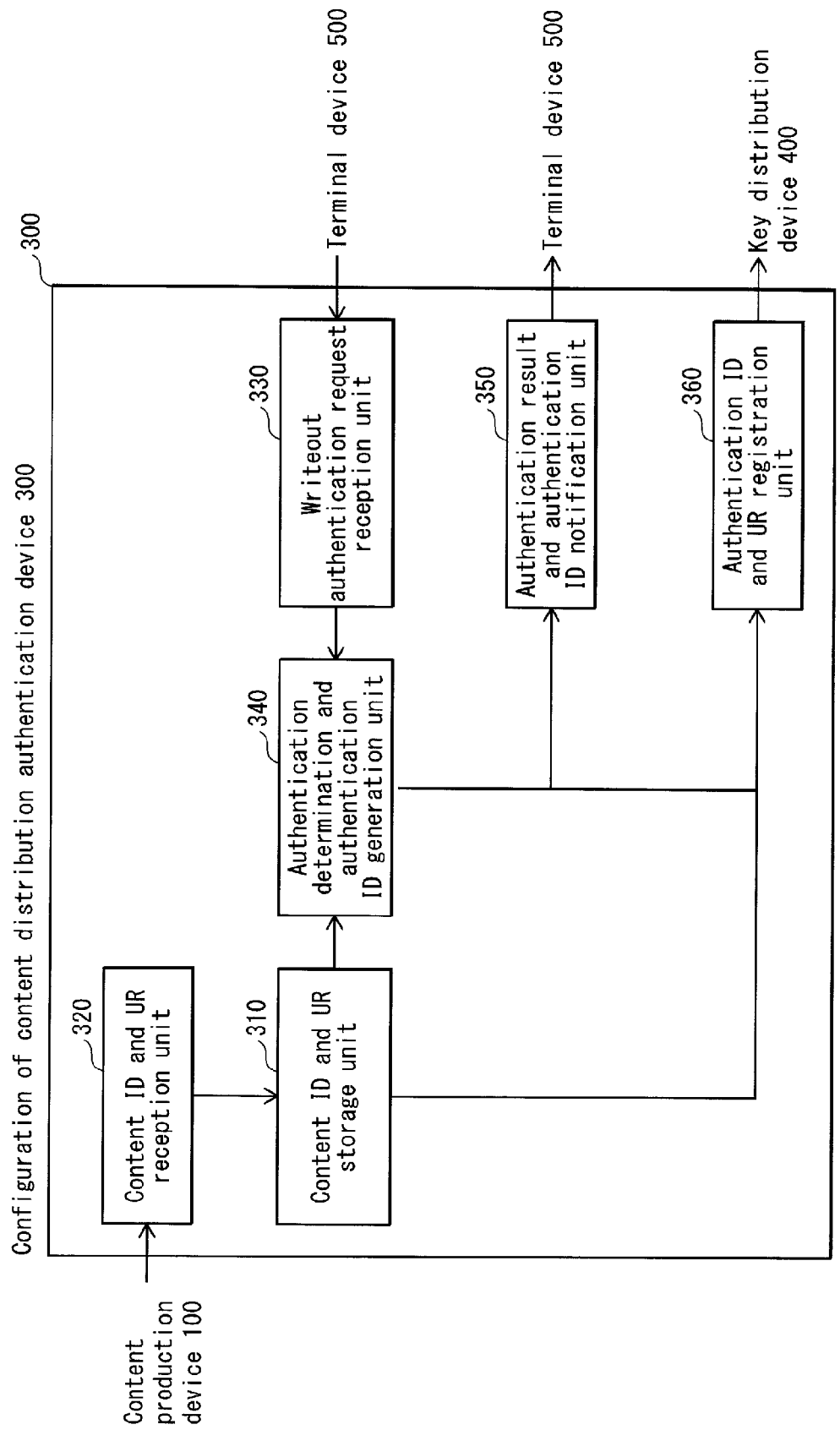
FIG. 7 is a block diagram illustrating the principal functional configuration of a content distribution authentication device 300 pertaining to the exemplary Embodiment.

FIG. 7 is a block diagram illustrating the principal functional configuration of the content distribution authentication device 300.

As shown, the content distribution authentication device 300 includes a content ID and UR storage unit 310, a content ID and UR reception unit 320, a writeout authentication request reception unit 330, an authentication determination and authentication ID generation unit 340, an authentication result and authentication ID notification unit 350, and an authentication ID and UR registration unit 360.

The content distribution authentication device 300 includes a processor, memory, and a NIC. The function of the authentication determination and authentication ID generation unit 340 is realized by having the processor execute a program stored in the memory. Data transfer by the content ID and UR reception unit 320, the writeout authentication request reception unit 330, the authentication result and authentication ID notification unit 350, and the authentication ID and UR registration unit 360 is performed using the NIC.

The content ID and UR storage unit 310 is a memory area for storing the content ID and paired UR.

The content ID and UR reception unit 320 receives the content ID and UR from the content production device 100 via the network for storage in the content ID and UR storage unit 310.

The writeout authentication request reception unit 330 receives writeout authentication request data 40 from the terminal device 500 via the network for output to the authentication determination and authentication ID generation unit 340.

Figure 8:
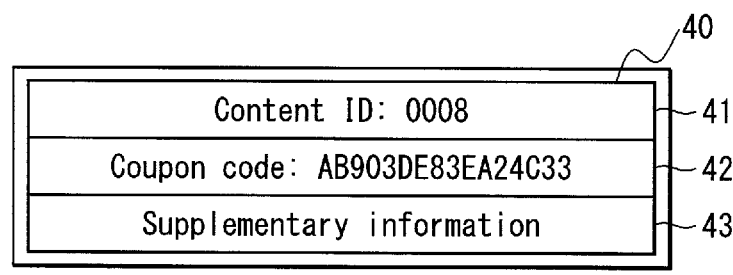
FIG. 8 illustrates a data configuration example and sample content for writeout authentication request data received by a content distribution authentication device 300 pertaining to the exemplary Embodiment.

FIG. 8 is a diagram illustrating a data configuration example and sample content for the writeout authentication request data 40.

As shown, the writeout authentication request data 40 includes the content ID 41, a coupon code 42, and supplementary information 43. In particular, the content ID 41 is an identifier for content that the terminal device 500 is attempting to record to the recording medium device 600. In FIG. 8, a sample content ID of 0008 is given.

The authentication determination and authentication ID generation unit 340 determines whether or not any content ID matching the content ID 41 in the writeout authentication request data 40 output by the writeout authentication request reception unit 330 is stored in the content ID and UR storage unit 310, and generates determination results accordingly. Specifically, in the affirmative case, the authentication determination and authentication ID generation unit 340 generates an authentication ID and an authentication result indicating success and, in the negative case, generates an authentication result indicating failure. In either case, the data so generated are output to the authentication result and authentication ID notification unit 350. The authentication determination and authentication ID generation unit 340 also outputs the authentication ID so generated to the authentication ID and UR registration unit 360.

The authentication result and authentication ID notification unit 350 transmits the authentication result output by the authentication determination and authentication ID generation unit 340 via the network to the terminal device 500. In particular, upon being output from the authentication determination and authentication ID generation unit 340, the authentication ID is also transmitted to the terminal device 500 via the network.

The authentication ID and UR registration unit 360 transmits the authentication ID output by the authentication determination and authentication ID generation unit 340 and the paired UR stored in the content ID and UR storage unit 310 via the network to the key distribution device 400.

(Authentication Process by Content Distribution Authentication Device 300)

Figure 9:
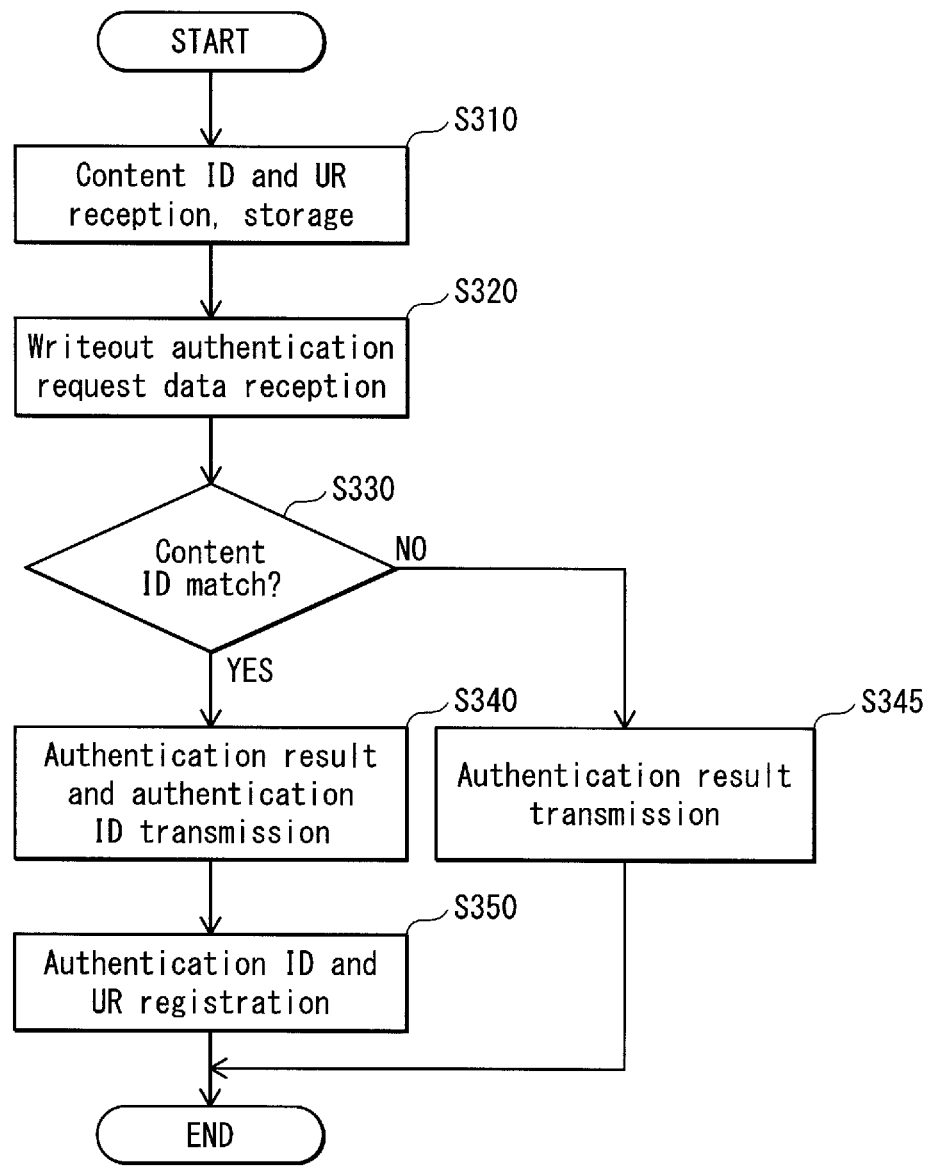
FIG. 9 is a flowchart of an authentication process by the content distribution authentication device 300 pertaining to the exemplary Embodiment.

FIG. 9 is a flowchart indicating the authentication processing by the content distribution authentication device 300.

The order of operations given below as steps S310 through S350 is an example of the authentication processing. For example, provided that step S310 is completed before S320 begins, the order of operations is not limited to that of the steps given below.

The content ID and UR reception unit 320 of the content distribution authentication device 300 receives the content ID and the UR from the content production device 100 for storage in the content ID and UR storage unit 310 (step S310).

The writeout authentication request reception unit 330 receives the writeout authentication request data 40 from the terminal device 500 (step S320). Subsequently, the authentication determination and authentication ID generation unit 340 determines whether or not the content ID 41 in the writeout authentication request data 40 received from the writeout authentication request reception unit 330 matches the content ID stored in the content ID and UR storage unit 310 (step S330).

In the affirmative case (YES in step S330), the authentication determination and authentication ID generation unit 340 generates the authentication ID along with an authentication result indicating success, and the authentication result and ID notification unit 350 transmits the authentication result and authentication ID to the terminal device 500 (step S340). Next, the authentication ID and UR registration unit 360 registers the authentication ID generated by the authentication determination and authentication ID generation unit 340 and the paired UR stored in the content ID and UR storage unit 310 through transmission to the key distribution device 400 (step S350). The content distribution authentication device 300 thus concludes the authentication process.

However, when step S330 returns no matching content ID (NO in step S330), the authentication determination and authentication ID generation unit 340 generates an authentication result indicating failure, and the authentication result and authentication ID notification unit 350 transmits the authentication result to the terminal device 500 (step S345). The content distribution authentication device 300 thus concludes the authentication process.

(Configuration of Key Distribution Device 400)

Figure 10:
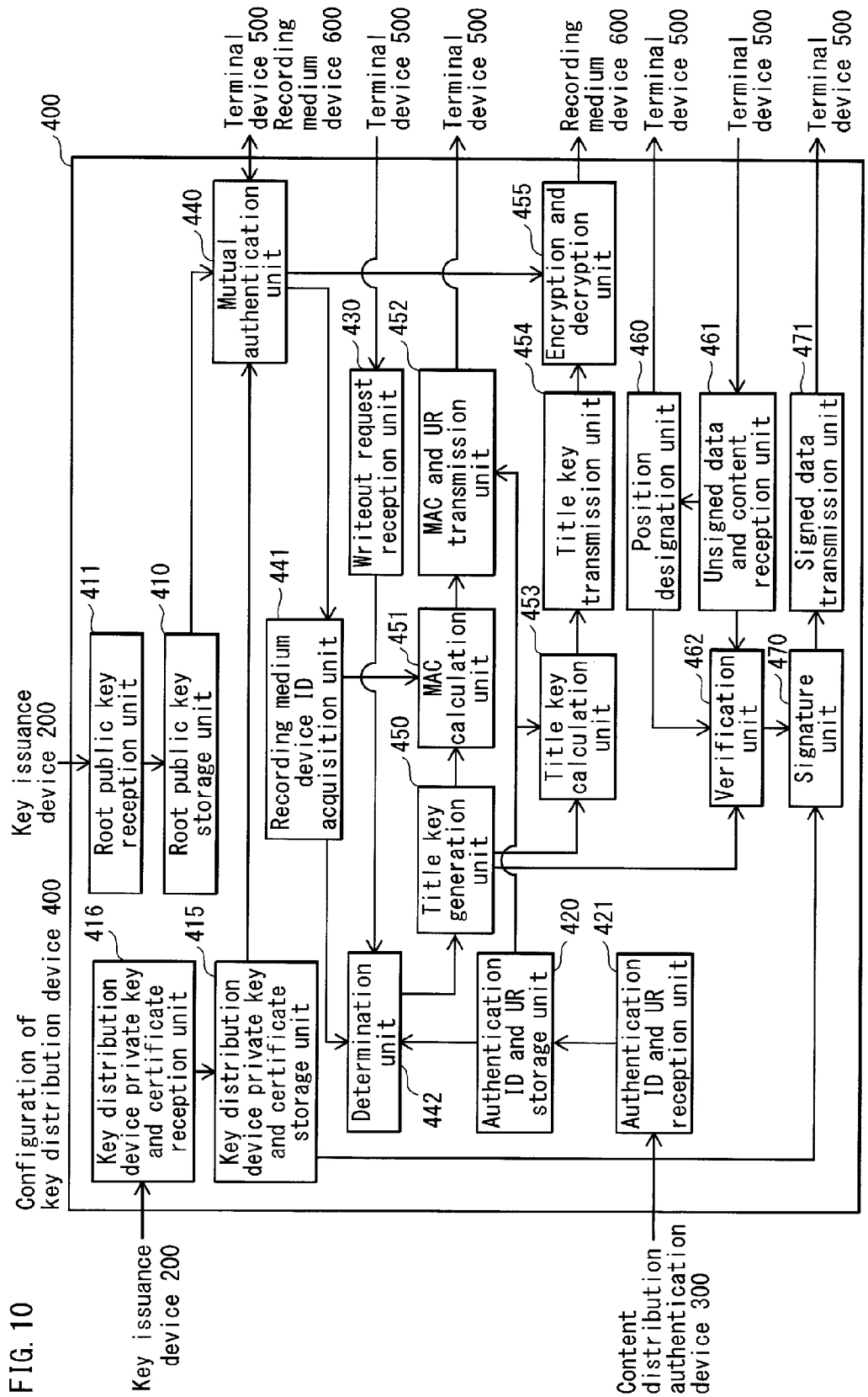
FIG. 10 is a block diagram illustrating the principal functional configuration of a key distribution device 400 pertaining to the exemplary Embodiment.

FIG. 10 is a block diagram illustrating the principal functional configuration of the key distribution device 400.

As shown, the key distribution device 400 includes a root public key storage unit 410, a root public key reception unit 411, a key distribution device private key and certificate storage unit 415, a key distribution device private key and certificate reception unit 416, an authentication ID and UR storage unit 420, an authentication ID and UR reception unit 421, a writeout request reception unit 430, a mutual authentication unit 440, a recording medium device ID acquisition unit 441, a determination unit 442, a title key generation unit 450, a MAC calculation unit 451, a MAC and UR transmission unit 452, a title key calculation unit 453, a title key transmission unit 454, an encryption and decryption unit 455, a position designation unit 460, an unsigned data and content reception unit 461, a verification unit 462, a signature unit 470, and a signed data transmission unit 471.

The key distribution device 400 includes a processor, memory, and a NIC. The functions of the mutual authentication unit 440, the recording medium device ID acquisition unit 441, the determination unit 442, the title key generation unit 450, the MAC calculation unit 451, the title key calculation unit 453, the encryption and decryption unit 455, the position designation unit 460, the verification unit 462, and the signature unit 470 are each realized by having the processor execute a program stored in the memory. Also, data transfer by the root public key reception unit 411, the key distribution device private key and certificate reception unit 416, the authentication ID and UR reception unit 421, the writeout request reception unit 430, the mutual authentication unit 440, the MAC and UR transmission unit 452, the title key transmission unit 454, the encryption and decryption unit 455, the position designation unit 460, the unsigned data and content reception unit 461, and the signed data transmission unit 471 is performed using the NIC.

The root public key storage unit 410 is a memory area for storing the root public key.

The root public key reception unit 411 receives the root public key transmitted by the key issuance device 200 via the network for storage in the root public key storage unit 410.

The key distribution device private key and certificate storage unit 415 is a memory area for storing a key distribution device private key and paired certificate.

The key distribution device private key and certificate reception unit 416 receives the key distribution device private key and paired certificate transmitted via the network from the key issuance device 200 for storage in the key distribution device private key and certificate storage unit 415.

The authentication ID and UR storage unit 420 is a memory area for storing the authentication ID and paired UR.

The authentication ID and UR reception unit 421 receives the authentication ID and paired UR transmitted via the network from the content distribution authentication device 300 for storage in the authentication ID and UR storage unit 420.

The writeout request reception unit 430 receives the writeout request data 50 from the terminal device 500 via the network for output to the determination unit 442.

Figure 11:
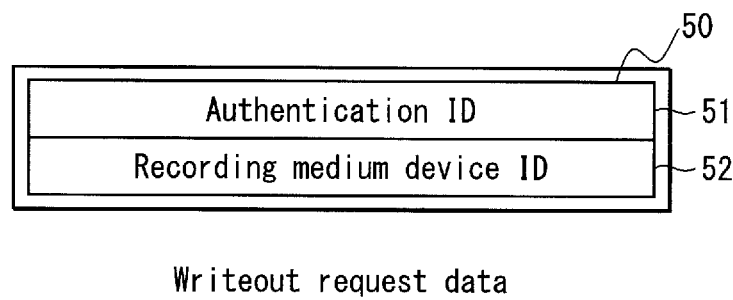
FIG. 11 illustrates a data configuration example for writeout request data received by the key distribution device 400 pertaining to the exemplary Embodiment.

FIG. 11 is a diagram illustrating a data configuration example and sample content for the writeout request data 50.

As shown, the writeout request data 50 are made up of the authentication ID 51 and a recording medium device ID 52.

The authentication ID 51 is the authentication ID received by the terminal device 500 from the content distribution authentication device 300. Also, the recording medium device ID 52 is the ID of the recording medium device 600 onto which the terminal device 500 is attempting to record the content.

The mutual authentication unit 440 performs mutual authentication with the terminal device 500 and with the recording medium device 600, sharing a common key therewith.

Figure 12:
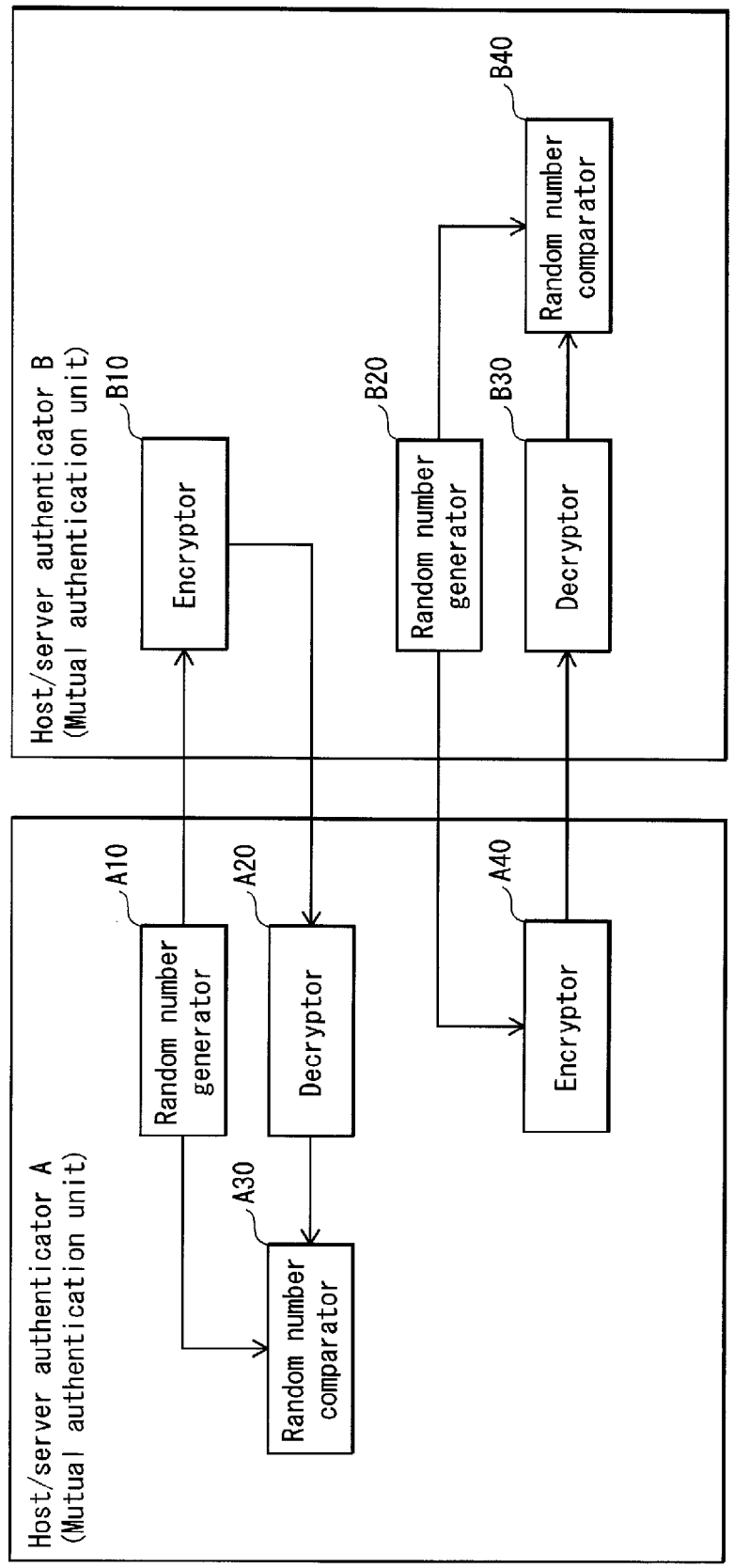
FIG. 12 is a block diagram of sample mutual authentication operations pertaining to the exemplary Embodiment.

FIG. 12 is a block diagram illustrating a sample order of operations for mutual authentication as performed between host/server authenticators A and B.

In this example, host/server authenticator A is the key distribution device 400 while host/server authenticator B is the terminal device 500 or the recording medium device 600.

The mutual authentication unit of host/server authenticator A includes a random number generator A10, a decryptor A20, a random number comparator A30, and an encryptor A40. Similarly, the mutual authentication unit of host-server authenticator B includes an encryptor B10, a random number generator B20, a decrypter B30, and a random number comparator B40.

(Authentication of Host/Server Authenticator B by Host/Server Authenticator A)

(a) The random number generator A10 in host/server authenticator A generates random number R1 for transmission to host/server authenticator B.

(b) The encryptor B10 in host/server authenticator B encrypts the random number R1 received from host/server authenticator A using a specific key Ksc (E (Ksc, R1)), and transmits the encrypted random number R1 (E (Ksc, R1)) to host/server authenticator A.

(c) The decryptor A20 in host/server authenticator A decrypts the data E (Ksc, R1) received from host/server authenticator B using the specific key Ksc (D (Ksc, (E (Ksc, R1)))) (=R1). This example represents successful authentication.

(d) The random number comparator A30 in host/server authenticator A compares the results of decryption D (Ksc, (E (Ksc, R1))) from step (c) to the random number R1 generated in step (a). When matching occurs, host/server authenticator A receives an authentication result to the effect that host/server authenticator B is a legitimate module.

(Authentication of Host/Server Authenticator A by Host/Server Authenticator B)

(e) The random number generator B20 in host/server authenticator B generates random number R2 for transmission to host/server authenticator A.

(f) The encryptor A40 in host/server authenticator A receives the random number R2 from host/server authenticator B, performs encryption using the specific key Ksc (E (Ksc, R2)), and transmits the encrypted random number R2 (E (Ksc, R2)) to host/server authenticator B (g) The decryptor B30 in host/server authenticator B decrypts the data E (Ksc, R2) received from host/server authenticator A using the specific key Ksc (D (Ksc, (E (Ksc, R2)))) (=R2). This example represents successful authentication.

(h) The random number comparator B40 in host/server authenticator B compares the results of decryption D (Ksc, (E (Ksc, R2))) from step (g) to the random number R2 generated in step (e). When matching occurs, host/server authenticator B receives an authentication result to the effect that host/server authenticator A is a legitimate module.

Upon receiving, in steps (d) and (h), notification to the effect that the other module is legitimate, host/server authenticators A and B obtain a common key by applying a one-way function to R1||R2 using Ksc, where || signifies data concatenation.

Although not detailed above, the mutual authentication performed between the key distribution device 400 and the terminal device 500 or between the key distribution device 400 and the recording medium device 600 may result in not only a common key but also a certificate being exchanged. The details of the certificate obtaining process are described in Non-Patent Literature 2, section 4.3 "Drive Authentication Algorithm for AACS (AACS-Auth)" (with particular reference to steps 7 and 13). The mutual authentication process is given as an example. Other approaches to mutual authentication may also be employed.

The remaining components of the key distribution device 400 are described with continued reference to FIG. 10.

The recording medium device ID acquisition unit 441 acquires the recording medium device ID 31 written in the recording medium device certificate 30 received during the mutual authentication performed by the mutual authentication unit 440 with the recording medium device 600, and outputs the certificate 30 to the determination unit 442 and the MAC calculation unit 451.

The determination unit 442 determines whether or not to grant the writeout request from the terminal device 500. Specifically, the determination unit 442 determines whether or not any authentication ID matching the authentication ID included in the writeout request data 50 output by the writeout request reception unit 430 is stored in the authentication ID and UR storage unit 420. Also, the determination unit 442 determines whether or not the recording medium device ID included in the writeout request data 50 output by the writeout request reception unit 430 matches the recording medium device ID output by the recording medium device ID acquisition unit 441. When the authentication ID is stored and the recording medium device IDs match, the determination unit 442 outputs determination results indicating that the writeout request is granted to the title key generation unit 450. Conversely, when the authentication ID is not stored or the recording medium device IDs do not match, the determination unit 442 outputs determination results indicating that the writeout request is not granted to the title key generation unit 450.

When the determination results output by the determination unit 442 indicate that the writeout request is granted, the title key generation unit 450 generates the title key for output to the MAC calculation unit 451, the title key calculation unit 453, and the verification unit 462. However, when the determination results output by the determination unit 442 indicate that the writeout request is not granted, the title key generation unit 450 outputs the determination results to the MAC and UR transmission unit 452 through the MAC calculation unit 451.

The MAC calculation unit 451 uses the title key output by the title key generation unit 450 to calculate a message authentication code (hereinafter, MAC) for the recording medium device ID output by the recording medium device ID acquisition unit 441, and outputs the MAC value so calculated to the MAC and UR transmission unit 452.

The MAC and UR transmission unit 452 transmits the MAC value for the recording medium device ID output by the MAC calculation unit 451 and the UR stored in the authentication ID and UR storage unit 420 via the network to the terminal device 500. Upon receiving the notification of determination results from the title key generation unit 450 via the MAC calculation unit 451 indicating that the writeout request is not granted, the MAC and UR transmission unit 452 outputs the determination results to the terminal device 500.

The title key calculation unit 453 calculates a hash value for the UR stored in the authentication ID and UR storage unit 420 and generates a calculated title key by applying a simple set of reversible operations, such as XOR, to the calculated hash value and the title key output by the title key generation unit 450. The title key calculation unit 453 outputs the calculated title key so generated to the title key transmission unit 454.

The title key transmission unit 454 transmits the calculated title key output by the title key calculation unit 453 via the encryption and decryption unit 455 to the recording medium device 600 via the network. The recording medium device 600 is used by insertion in a card slot on the terminal device 500. As described below, the transmission of the calculated title key to the recording medium device 600 is actually performed through the terminal device 500. However, in such transmissions, the terminal device 500 serves only as the communication channel between the key distribution device 400 and the recording medium device 600, and is fundamentally unconcerned with the content of the communicated data. That is, although communications are performed through the terminal device 500, these are considered equivalent to direct communication between the key distribution device 400 and the recording medium device 600.

The encryption and decryption unit 455 uses the common key generated during the mutual authentication process by the mutual authentication unit 440 to encrypt the calculated title key generated by the title key calculation unit 453 for transmission to the recording medium device 600. The calculated title key is thus securely transmitted to the recording medium device 600.

As described below, the position designation unit 460 generates position designation information designating a portion of content (hereinafter, content portion) to be subject to hash value comparison by the verification unit 462, in terms of position and size within the content that the terminal device is attempting to write to the recording medium device 600, and transmits the position designation information so generated via the network to the terminal device 500. The position designation unit 460 also outputs the position designation information so generated to the verification unit 462. The position designation unit 460 may select the position within the content randomly, or in accordance with some rule.

The unsigned data and content reception unit 461 receives the unsigned data 70 from the terminal device 500 via the network, outputs the unsigned data 70 so received to the verification unit 462, and notifies the position designation unit 460 of unsigned data 70 reception. The unsigned data and content reception unit 461 also receives, from the terminal device 500, the content portion designated in the position designation information output by the position designation unit 460, and outputs the content portion to the verification unit 462.

Figure 13A:
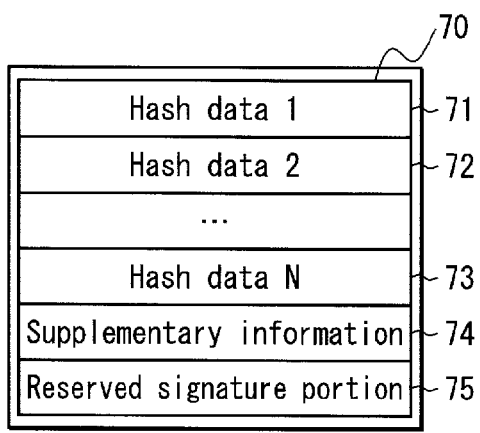
FIGS. 13A and 13B illustrate a data configuration example for unsigned data 70 received by the key distribution device 400 and for signed data 76 transmitted by the key distribution device 400 pertaining to the exemplary Embodiment.

FIG. 13A indicates a sample data configuration for the unsigned data 70.

As shown, the unsigned data 70 are made up of hash data 1 71, 2 72, . . . N 73, supplementary information 74, and a reserved signature portion 75.

Each piece of hash data (reference signs 71 through 73) is a hash value for the corresponding encrypted content portion, as divided. Although the pieces of hash data are here described as hash values calculated for the encrypted content, the hash values may also be calculated for unencrypted portions of plain-text content.

The reserved signature portion 75 is a reserved area for storing a signature 78 in later-described signed data 76. The supplementary information 74 is, for example, information specifying or pertaining to the content, used for content associations.

The verification unit 462 verifies the legitimacy of the unsigned data 70 output by the unsigned data and content reception unit 461. Specifically, the verification unit 462 encrypts the content portion output by the unsigned data and content reception unit 461 using the title key output by the title key generation unit 450, and calculates a hash value therefor. The verification unit 462 then determines whether or not the hash value so calculated matches the hash value corresponding to the above-described content portion as written in the unsigned data 70, and outputs determination results to the signature unit 470 indicating that the unsigned data 70 are legitimate when matching occurs, and indicating that the unsigned data 70 are illegitimate when no matching occurs. The verification unit 462 specifies the hash value corresponding to the content portion among the hash values written in the unsigned data 70 according to the position designation information received from the position designation unit 460.

Upon receiving determination results from the verification unit 462 indicating that the unsigned data 70 are legitimate, the signature unit 470 uses the key distribution device private key stored in the key distribution device private key and certificate storage unit 415 to sign the unsigned data 70, thus generating signed data 76. The signature unit 470 outputs the signed data 76 so generated to the signed data transmission unit 471. Upon receiving determination results from the verification unit 462 indicating that the unsigned data 70 are illegitimate, the signature unit 470 outputs the determination results to the signed data transmission unit 471.

Figure 13B:
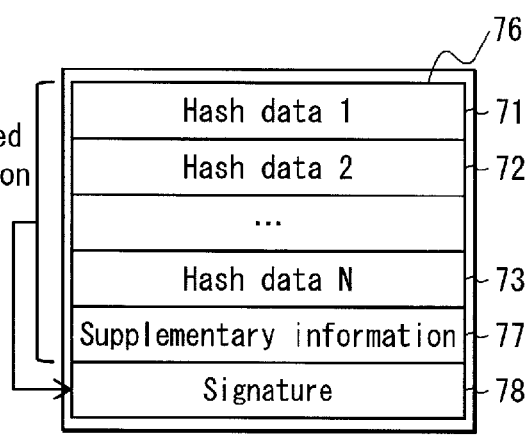

FIG. 13B indicates a sample data configuration for the signed data 76.

As shown, the signed data 76 are made up of hash data 1 71, 2 72, . . . N 73, supplementary information 77, and a signature 78.

The hash data (reference signs 71 through 73) are identical to those included in the unsigned data 70. The signature 78 is generated by using the key distribution device private key on the hash data (reference signs 71 through 73) and the supplementary information 77. The supplementary information 77 may include the original data used to calculate the hash data, information indicating the position and size within the content indicating such original data, or similar. The supplementary information 77 is not limited to the content portion but may also include information designating something other than a content portion, or designate information unrelated to content portions.

The signed data transmission unit 471 transmits the signed data 76 output by the signature unit 470 to the terminal device 500 via the network. Upon receiving determination results from the signature unit 470 indicating that the unsigned data 70 are illegitimate, the signed data transmission unit 471 outputs the determination results to the terminal device 500.

(Process by Key Distribution Device 400)

The pre-distribution process by the key distribution device 400 is described first.

Figure 14:
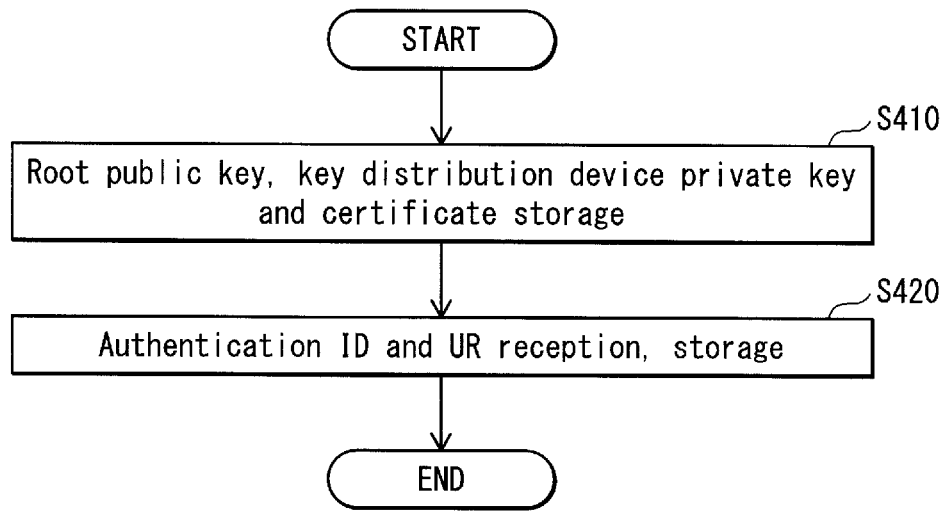
FIG. 14 is a flowchart indicating a pre-distribution process by the key distribution device 400 pertaining to the exemplary Embodiment.

FIG. 14 is a flowchart indicating the pre-distribution process by the key distribution device 400.

The order of operations for the pre-distribution process made up of steps S410 and S420 is given as an example, below. No limitation is intended regarding the order of the steps. That is, step S420 may be executed before step S410.

The root public key reception unit 411 of the key distribution device 400 receives the root public key from the key issuance device 200 for storage in the root public key storage unit 410. Also, the key distribution device private key and certificate reception unit 416 receives the key distribution device private key and paired certificate from the key issuance device 200 for storage in the key distribution device private key and certificate storage unit 415 (step S410).

The authentication ID and UR reception unit 421 receives the authentication ID and paired UR from the content distribution authentication device 300 for storage in the authentication ID and UR storage unit 420 (step S420). The key distribution device 400 then concludes the pre-distribution process.

The distribution process by the key distribution device 400 is described next.

Figure 15:
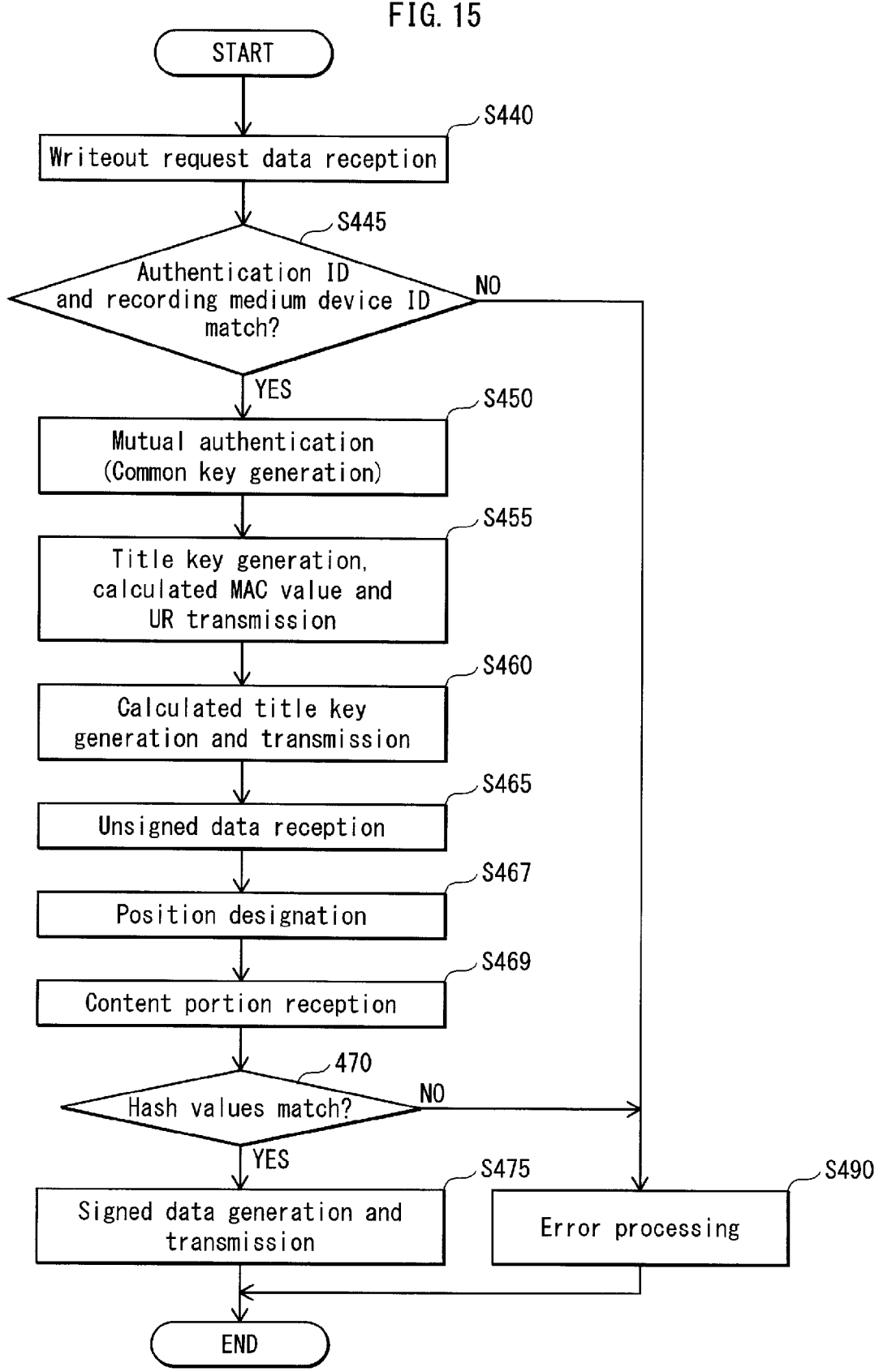
FIG. 15 is a flowchart indicating a distribution process by the key distribution device 400 pertaining to the exemplary Embodiment.

FIG. 15 is a flowchart indicating the distribution process by the key distribution device 400.

The writeout request reception unit 430 of the key distribution device 400 receives the writeout request data 50 from the terminal device 500 (step S440). The determination unit 442 determines whether or not to grant the writeout request from the terminal device 500 according to the writeout request data 50 so received (step S445). Specifically, the determination unit 442 verifies whether or not a match for the authentication ID 51 in the writeout request data 50 received by the writeout request reception unit 430 is stored in the authentication ID and UR storage unit 420, and whether or not the recording medium device ID 52 in the writeout request data 50 matches the recording medium device ID acquired by the recording medium device ID acquisition unit 441.

When the authentication ID is not stored or the recording medium device IDs do not match (NO in step S445), the determination unit 442 outputs determination results indicating that the writeout request from the terminal device 500 is not granted to the terminal device 500 via the title key generation unit 450, the MAC calculation unit 451, and the MAC and UR transmission unit 452 (step S490). The key distribution device 400 then concludes the distribution process.

Conversely, when the authentication ID is stored and the recording medium device IDs match (YES in step S445), the mutual authentication unit 440 performs mutual authentication with the recording medium device 600 confirming whether or not the recording medium device 600 is trustworthy and simultaneously generating a common key. The subsequent transfers use the common key to protect data by encryption and decryption (step S450).

The title key generation unit 450 generates the title key. The MAC calculation unit 451 uses the title key generated by the title key generation unit 450 to calculate a MAC value for the recording medium device ID acquired by the recording medium device ID acquisition unit 441. Also, the MAC and UR transmission unit 452 transmits the MAC value for the recording medium device ID as calculated by the MAC calculation unit 451 and the UR stored in the authentication ID and UR storage unit 420 to the terminal device 500 (step S455).

The title key calculation unit 453 calculates a hash value for the UR stored in the authentication ID and UR storage unit 420 and generates a calculated title key by applying a simple set of reversible operations, such as XOR, to the generated hash value and the title key output by the title key generation unit 450. The title key transmission unit 454 transmits the calculated title key generated by the title key calculation unit 453 through the encryption and decryption unit 455 to the recording medium device 600 (step S460).

The unsigned data and content reception unit 461 receives the unsigned data 70 from the terminal device 500 (step S465). The position designation unit 460 generates position designation information for the content portion subject to determination in the later-described step S470, and transmits this information along to the terminal device 500 (step S467).

The unsigned data and content reception unit 461 receives, from the terminal device 500, the content portion designated by the position designation information transmitted by the position designation unit 460 (step S469). The verification unit 462 verifies the legitimacy of the unsigned data 70 received by the unsigned data and content reception unit 461 (step S470). Specifically, the verification unit 462 encrypts the content portion received by the unsigned data and content reception unit 461 using the title key generated in step S455 by the title key generation unit 450 and generates a hash value therefor. The verification unit 462 determines whether or not the hash value so calculated matches the hash value corresponding to the content portion written in the unsigned data 70.

In the negative case (NO in step S470), the verification unit 462 outputs, via the signature unit 470 and the signed data transmission unit 471, verification results to the terminal device 500 indicating that the unsigned data 70 are illegitimate (step S490). The key distribution device 400 then concludes the distribution process.

Conversely, in the affirmative case (YES in step S470), the signature unit 470 uses the key distribution device private key stored in the key distribution device private key and certificate storage unit 415 to sign the signature target portion of the unsigned data 70, thus generating signed data 76. Also, the signed data transmission unit 471 transmits the signed data 76 generated by the signature unit 470 to the terminal device 500 (step S475). The key distribution device 400 then concludes the distribution process.

(Configuration of Terminal Device 500)

Figure 16:
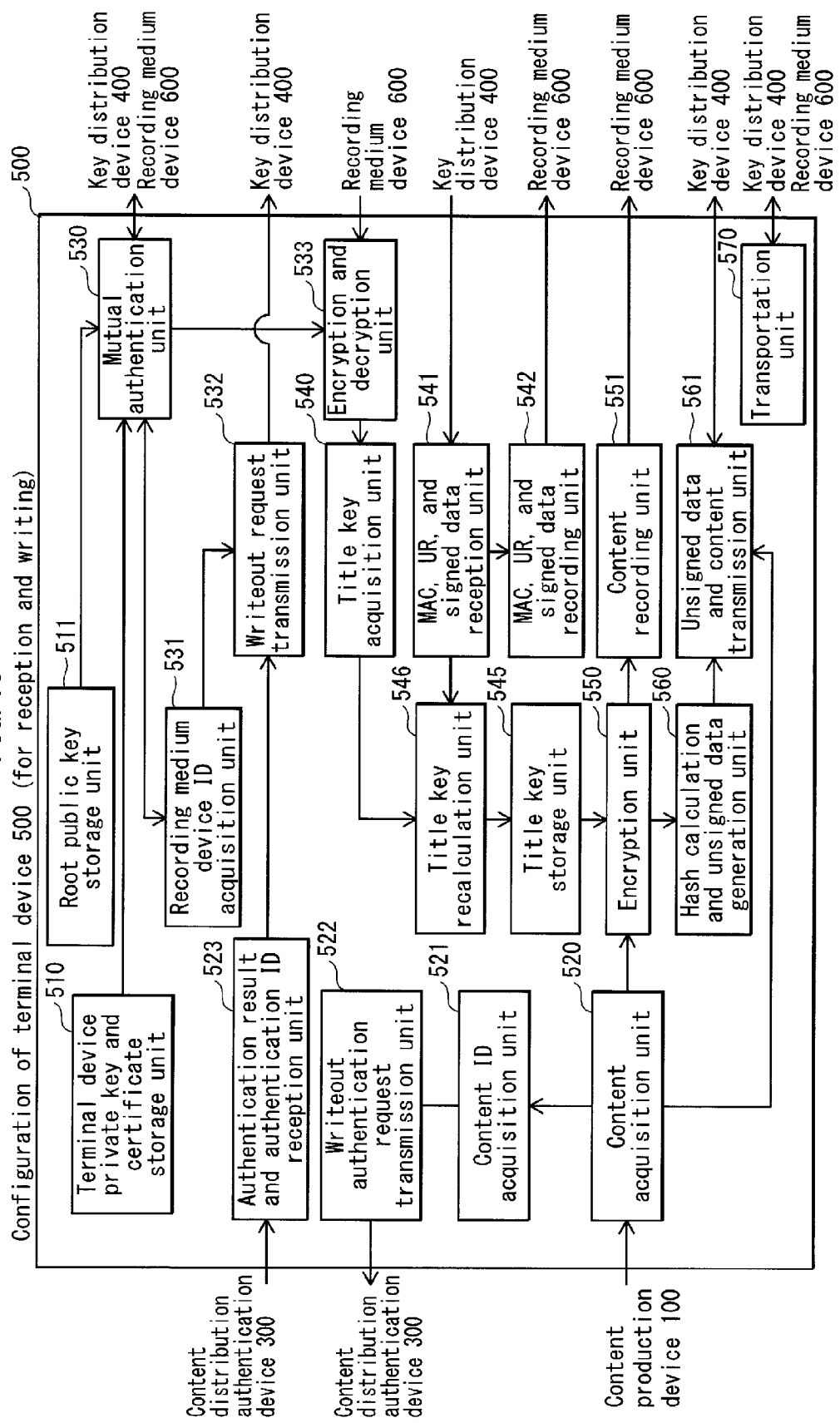
FIG. 16 is a block diagram illustrating the principal functional configuration of a terminal device 500 performing a receiving and writing process pertaining to the exemplary Embodiment.
Figure 17:
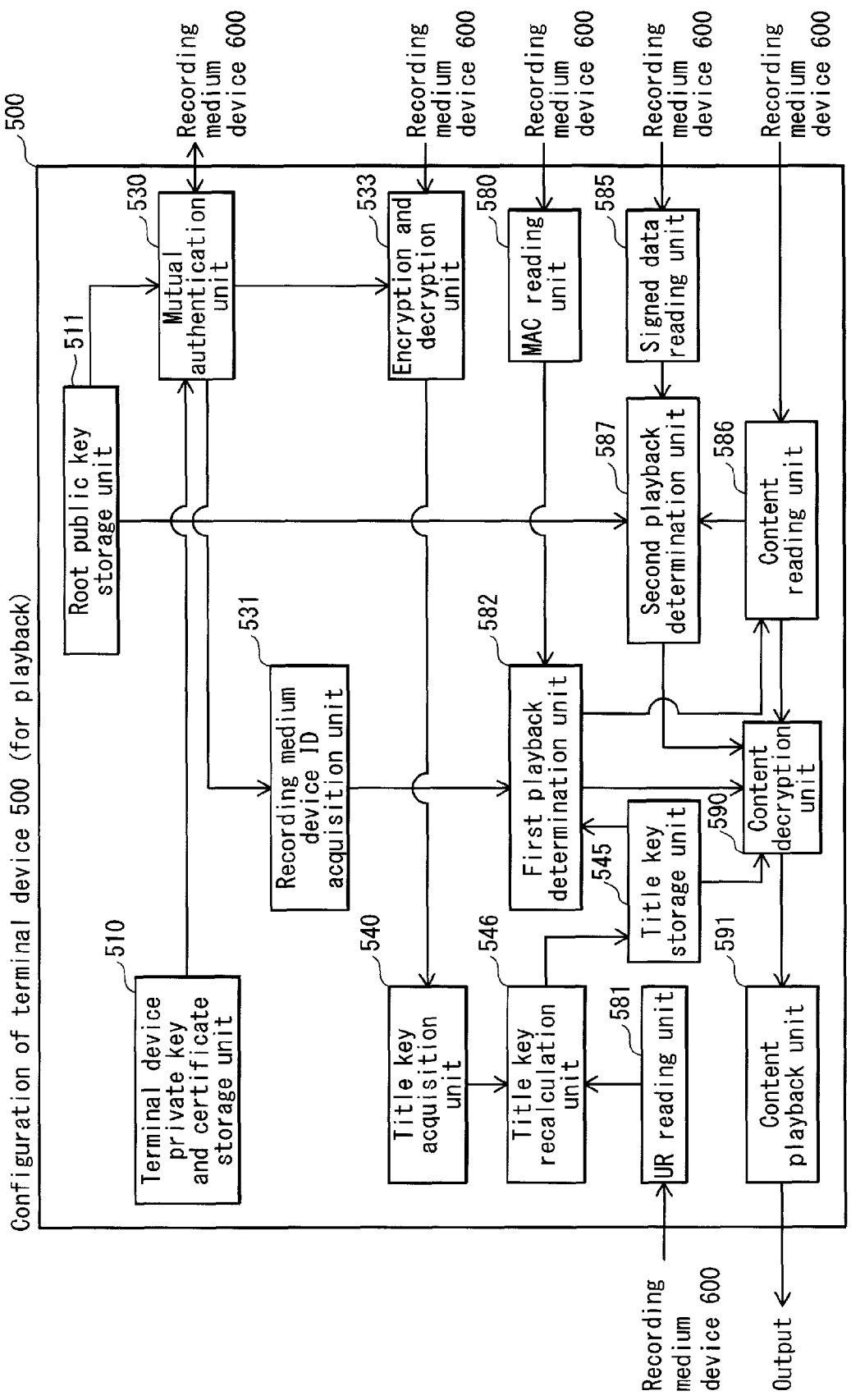
FIG. 17 is a block diagram illustrating the principal functional configuration of the terminal device 500 performing a playback process pertaining to the exemplary Embodiment.

FIG. 16 is a block diagram illustrating the functional configuration of the principal components of the terminal device 500 for a reception and writing process, while FIG. 17 is a block diagram illustrating the functional configuration of the principal components of the terminal device 500 for a playback process.

With reference to FIG. 16, the following describes the configuration of the terminal device 500, in concert with the content distribution authentication device 300 and the key distribution device 400, pertaining to reception of data, such as keys and content, required for content protection and playback, and to writing to the recording medium device 600. Similarly, with reference to FIG. 17, the following describes the configuration of the terminal device 500 pertaining to reading content and data, such as keys, from the recording medium device 600 for playback, provided that the aforementioned writing of content and data to the recording medium device 600 has been completed. Components repeated in the reception and writing process and in the playback process use the same names and reference signs in both FIGS. 16 and 17.

As shown, the terminal device 500 includes a terminal device private key and certificate storage unit 510, a root public key storage unit 511, a content acquisition unit 520, a content ID acquisition unit 521, a writeout authentication request transmission unit 522, an authentication result and authentication ID reception unit 523, a mutual authentication unit 530, a recording medium device ID acquisition unit 531, a writeout request transmission unit 532, an encryption and decryption unit 533, a title key acquisition unit 540, a MAC, UR, and signed data reception unit 541, a MAC UR and signed data recording unit 542, a title key storage unit 545, a title key recalculation unit 546, an encryption unit 550, a content recording unit 551, a hash calculation and unsigned data generation unit 560, an unsigned data and content transmission unit 561, a transportation unit 570, a MAC reading unit 580, a UR reading unit 581, a first playback determination unit 582, a signed data reading unit 585, a content reading unit 586, a second playback determination unit 587, a content decryption unit 590, and a content playback unit 591.

The terminal device 500 includes a processor, memory, and a NIC. The functions of the writeout authentication request transmission unit 522, the mutual authentication unit 530, the recording medium device ID acquisition unit 531, the writeout request transmission unit 532, the encryption and decryption unit 533, the title key acquisition unit 540, the title key recalculation unit 546, the encryption unit 550, the hash calculation and unsigned data generation unit 560, the first playback determination unit 582, the second playback determination unit 587, the content decryption unit 590, and the content playback unit 591 are each realized by having the processor execute a program stored in the memory. Also, data transfer by the writeout authentication request transmission unit 522, the authentication result and authentication ID reception unit 523, the mutual authentication unit 530, the writeout request transmission unit 532, the MAC, UR, and signed data reception unit 541, the unsigned data and content transmission unit 561, and the transportation unit 570 is performed using the NIC.

The terminal device private key and certificate storage unit 510 is a memory area for storing a terminal device private key and paired certificate 20. In practice, the writing of the terminal device private key and certificate 20 to the terminal device private key and certificate storage unit 510 is realized by a terminal manufacturing apparatus writing the private key and certificate generated by the key issuance device 200 during manufacture of the terminal device 500. The details of the writing process for the terminal device private key and certificate 20 are omitted.

The root public key storage unit 511 is a memory area for storing the root public key. In practice, the writing of the root public key to the root public key storage unit 511 is realized during manufacture of the terminal device 500 by the terminal manufacturing apparatus writing the root public key generated by the key issuance device 200. The details of the writing process for the root public key are omitted.

The content acquisition unit 520 acquires the content distributed by the content production device 100. The content acquisition unit 520 outputs the content so acquired to the content ID acquisition unit 521 and outputs plain-text content, obtained by decrypting the acquired content, to the encryption unit 550 and to the unsigned data and content transmission unit 561. As described above, in the exemplary Embodiment, content distribution by the content production device 100 is realized by, for example, inserting a recording medium such as a DVD or BD on which content is recorded into the disc drive of the terminal device 500.

The content ID acquisition unit 521 acquires the content ID of the content output by the content acquisition unit 520 and outputs the ID to the writeout authentication request transmission unit 522. The content ID acquisition unit 521 acquires the content ID by generating the content ID as described above for the content ID generation unit 151 of the content production device 100.

The writeout authentication request transmission unit 522 generates writeout authentication request data 40 (see FIG. 8), including the content ID output by the content ID acquisition unit 521, for output to the content distribution authentication device 300.

The authentication result and authentication ID reception unit 523 receives, from the content distribution authentication device 300, the authentication result based on the writeout authentication request data 40 transmitted by the writeout authentication request transmission unit 522. Specifically, the authentication result and authentication ID reception unit 523 further receives the authentication ID when the authentication result indicates success, then outputs the authentication ID so received to the writeout request transmission unit 532. In AACS, for example, a common mechanism may be used for transmitting the writeout authentication request data and receiving the authentication result (i.e., managed copy).

The mutual authentication unit 530 performs mutual authentication with the key distribution device 400 and with the recording medium device 600, sharing a common key and exchanging certificates (the key distribution device certificate 10, the terminal device certificate 20, and the recording medium device certificate 30) therewith. The operations involved in the mutual authentication are as described above (see FIG. 12).

The recording medium device ID acquisition unit 531 acquires the recording medium device ID 31 written in the recording medium device certificate 30 received during mutual authentication with the recording medium device 600 by the mutual authentication unit 530, and outputs the ID to the writeout request transmission unit 532.

The writeout request transmission unit 532 generates writeout request data 50 (see FIG. 11) that includes the authentication ID output by the authentication result and authentication ID reception unit 523 and the recording medium device ID output by the recording medium device ID acquisition unit 531, then transmits the data so generated to the key distribution device 400.

The encryption and decryption unit 533 uses the common key generated during the mutual authentication process by the mutual authentication unit 530 to encrypt the data at transmission time and decrypt the data at reception time, and thus securely exchanges data with the recording medium device 600. Specifically, the encryption and decryption unit 533 receives the calculated title key, as encrypted using the common key, from the recording medium device 600 and uses the common key to decrypt, and thus safely receive, the calculated title key.

The title key acquisition unit 540 acquires the calculated title key from the recording medium device 600 through the encryption and decryption unit 533 for output to the title key recalculation unit 546.

The MAC, UR, and signed data reception unit 541 receives the MAC value for the recording medium device ID of the recording medium device 600, the UR for the content corresponding to the authentication ID 51 included in the writeout request data 50 transmitted by the writeout request transmission unit 532, and the signed data from the key distribution device 400, and outputs these to the MAC, UR, and signed data recording unit 542. The MAC, UR, and signed data reception unit 541 also outputs the UR so received to the title key recalculation unit 546. The MAC, UR, and signed data reception unit 541 also receives determination results indicating that the writeout request is not granted when such determination results have been transmitted from the key distribution device 400.

The MAC, UR, and signed data recording unit 542 records the MAC value, UR, and signed data output by the MAC, UR, and signed data reception unit 541 to the recording medium device 600.

The title key storage unit 545 is a memory area for storing a title key.

The title key recalculation unit 546 calculates a hash value for the UR, acquires the original title key by applying the simple set of reversible operations, such as XOR, to the calculated hash value and to the calculated title key output by the title key acquisition unit 540, and stores the original title key in the title key storage unit 545. In practice, the UR used for the hash value calculation in the reception and writing process is output by the MAC, UR, and signed data reception unit 541, while in the playback process, the UR so used is output from the UR reading unit 581.

The encryption unit 550 encrypts plain-text content output by the content acquisition unit 520 using the title key stored in the title key storage unit 545, then outputs the resulting content to the content recording unit 551 and the hash calculation and unsigned data generation unit 560.

The content recording unit 551 records the content output by the encryption unit 550 to the recording medium device 600.

The hash calculation and unsigned data generation unit 560 divides the content output by the encryption unit 550 into a plurality of portions and calculates a hash value for each portion, generates unsigned data 70 (see FIG. 13A) with the hash values so calculated as hash data (reference signs 71 through 73), and outputs the result to the unsigned data and content transmission unit 561. The unsigned data 70 generated by the hash calculation and unsigned data generation unit 560 also include supplementary information 74, as appropriate.

The unsigned data and content transmission unit 561 transmits the unsigned data 70 output by the hash calculation and unsigned data generation unit 560 to the key distribution device 400. The unsigned data and content transmission unit 561 also receives position designation information from the key distribution device 400, extracts a content portion designated by the position designation information so received from the plain-text content output by the content acquisition unit 520, and outputs the content portion to the key distribution device 400.

The transportation unit 570 relays communications data between the key distribution device 400 and the recording medium device 600. With the exception of data pertaining to control, such as stop notifications, the transportation unit 570 serves as a relay between the key distribution device 400 and the recording medium device 600 without knowing the content of the data being communicated. Communications between the key distribution device 400 and the recording medium device 600, particularly those concerning the calculated title key, are performed with the data being encrypted using the common key generated in the mutual authentication process by the key distribution device 400 and the recording medium device 600. Given that the common key is common only to the key distribution device 400 and the recording medium device 600, the terminal device 500 is, of course, unable to decrypt and reference the calculated title key data during relay. That is, the calculated title key is protected during transportation.

The MAC reading unit 580 reads the MAC value from the recording medium device 600 on which the content is recorded and outputs the value to the first playback determination unit 582.

The UR reading unit 581 reads the UR pertaining to content playback from the recording medium device 600 and outputs the UR to the title key recalculation unit 546.

The first playback determination unit 582 uses the title key stored in the title key storage unit 545 to calculate a MAC value for the recording medium ID output by the recording medium device ID acquisition unit 531, then determines whether or not the MAC value so calculated matches that recorded on the recording medium device 600 as output by the MAC reading unit 580. The first playback determination unit 582 grants the content reading unit 586 permission to read the content when the MAC values match, and does not grant such permission when the MAC values do not match. That is, content playback is controlled so as to depend on the determination results from the first playback determination unit 582. When not granting permission to read the content, the first playback determination unit 582 displays a notification to such effect for the user on a television or similar output device via the content decryption unit 590 and the content playback unit 591.

The signed data reading unit 585 reads the signed data 76 for the content to be played back from the recording medium device 600 and outputs the data to the second playback determination unit 587.

When permitted to read the content by the first playback determination unit 582, the content reading unit 586 reads the content to be played back from the recording medium device 600 and outputs the content to the second playback determination unit 587 and to the content decryption unit 590.

The second playback determination unit 587 verifies the signature 78 of the signed data 76 recorded on the recording medium device 600 and output by the signed data reading unit 585 using the root public key stored in the root public key storage unit 511 and the key distribution device public key written in the key distribution device certificate 10 received during the mutual authentication with the key distribution device 400. When the signature 78 is valid, the second playback determination unit 587 also calculates hash values for the content portions resulting from division of the content recorded on the recording medium device 600 and output by the content reading unit 586, then determines whether or not the hash values so calculated match the hash values (reference signs 71 through 73) in the signed data 76. The second playback determination unit 587 permits the content decryption unit 590 to decrypt the content when the hash values match, and does not do so when the hash values do not match. That is, content playback is controlled so as to depend not only on the determination results from the first playback determination unit 582 but also from the determination results from the second playback determination unit 587. When not granting permission to decrypt the content, the second playback determination unit 587 displays a notification to such effect for the user on a television or similar output device via the content decryption unit 590 and the content playback unit 591.

The content decryption unit 590 acquires plain-text content by decrypting the content recorded on the recording medium device 600 and output by the content reading unit 586 using the title key stored in the title key storage unit 545, then outputs the plain-text content to the content playback unit 591.

The content playback unit 591 plays back the plain-text content output by the content decryption unit 590 on the television or similar playback device.

(Process by Terminal Device 500)

First, the reception and writing process by the terminal device 500 is described.

Figure 18:
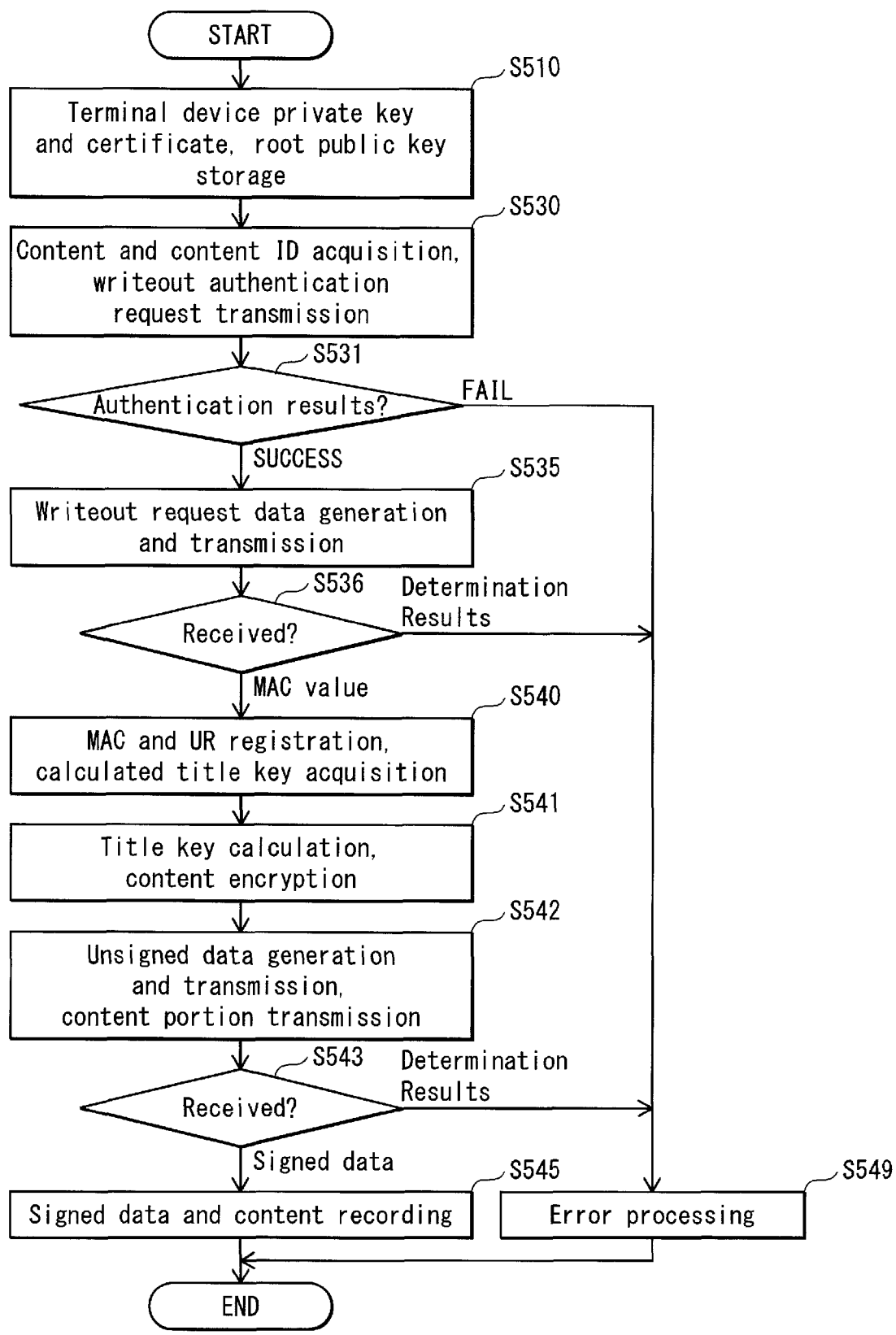
FIG. 18 is a flowchart of the reception and writing process by the terminal device 500 pertaining to the exemplary Embodiment.

FIG. 18 is a flowchart indicating the reception and writing process by the terminal device 500.

The order of operations for the reception and writing process made up of steps S510 through S549 is given as an example. No limitation is intended regarding the order of the steps. For example, while step S530 is executed upon receipt of a writeout request operation, which includes a designation of content to be written, from the user of the terminal device 500, step S510 may be performed at any time provided that the operations thereof are complete before step S530 begins.

As indicated, while manufacturing the terminal device 500, the terminal device manufacturing apparatus stores the terminal device private key and certificate 20 in the terminal device private key and certificate storage unit 510 of the terminal device 500 and stores the root public key in the root public key storage unit 511 (step S510).

The content acquisition unit 520 acquires the content distributed by the content production device 100. Given circumstances, such as those of AACS managed copy, in which content recorded in an AACS-supported protected format on the BD is acquired and copied onto a memory card, such as an SD card, in a different protected format, the content recorded on the BD, being encrypted in the AACS-supported protected format, is decrypted in order to obtain plain-text content.

The content ID acquisition unit 521 acquires the content ID from the content acquired by the content acquisition unit 520.

The writeout authentication request transmission unit 522 generates writeout authentication request data 40, which includes the content ID acquired by the content ID acquisition unit 521, for transmission to the content distribution authentication device 300 (step S530).

The authentication result and authentication ID reception unit 523 receives the results of the authentication performed by the content distribution authentication device 300 according to the writeout authentication request data 40 transmitted during step S530, and determines whether or not the received authentication result indicates success (step S531).

When the authentication result indicates failure (FAIL in step S531), the authentication result and authentication ID reception unit 523 notifies the user that the content cannot be written through a display on a (non-diagrammed) display unit of the terminal device 500 (step S549). The terminal device 500 then concludes the reception and writing process.

However, when the received authentication result indicates success (SUCCESS in step S531), the authentication result and authentication ID reception unit 523 additionally receives the authentication ID. The writeout request transmission unit 532 generates writeout request data 50, made up of the authentication ID received by the authentication result and authentication ID reception unit 523 and the recording medium device ID acquired by the recording medium device ID acquisition unit 531 through the mutual authentication process performed by the mutual authentication unit 530 with the recording medium device 600, and transmits the writeout request data 50 so generated to the key distribution device 400 (step S535).

The MAC, UR, and signed data reception unit 541 repeatedly determines whether or not any data have been received from the key distribution device 400 (step S536). Upon receipt of determination results indicating that the writeout request is not granted (Determination Results in step S536), the user is notified that the content cannot be written through a display on the (non-diagrammed) display unit of the terminal device 500 (step S549). The terminal device 500 then concludes the reception and writing process.

Conversely, upon receipt of the MAC value for the recording medium device ID of the recording medium device 600 and the UR for the content corresponding to the authentication ID in the writeout request data 50 transmitted during step S536 (MAC value in step S536), the MAC, UR, and signed data reception unit 541 outputs the MAC value and the UR so received to the MAC, UR, and signed data recording unit 542. The MAC, UR, and signed data recording unit 542 records the MAC value and UR output by the MAC, UR, and signed data reception unit 541 to the recording medium device 600. Further, the title key acquisition unit 540 acquires the calculated title key from the recording medium device 600 through the encryption and decryption unit 533 (step S540).

The title key recalculation unit 546 calculates a hash value for the UR output by the MAC, UR, and signed data reception unit 541, calculates the original title key by applying the simple set of reversible operations, such as XOR, to the calculated hash value and to the calculated title key acquired by the title key acquisition unit 540, and stores the original title key in the title key storage unit 545. Further, the encryption unit 550 encrypts the plain-text content acquired by the content acquisition unit 220 using the title key stored in the title key storage unit 545 (step S541).

When the content encrypted by the encryption unit 550 has been divided into a plurality of portions, the hash calculation and unsigned data generation unit 560 calculates a hash value for each portion and generates unsigned data 70 using the hash values so calculated as hash data (reference signs 71 through 73). The unsigned data and content transmission unit 561 also transmits the unsigned data 70 generated by the hash calculation and unsigned data generation unit 560 to the key distribution device 400.

The unsigned data and content transmission unit 561 also receives position designation information from the key distribution device 400, and extracts a content portion as designated by the position designation information so received from the plain-text content acquired by the content acquisition unit 520 for transmission to the key distribution device 400 (step S542).

The MAC, UR, and signed data reception unit 541 repeatedly determines whether or not any data have been received from the key distribution device 400 (step S543). Upon receipt of determination results indicating that the unsigned data 70 are illegitimate (Determination Results in step S543), the user is notified that the content cannot be written through a display on the (non-diagrammed) display unit of the terminal device 500 (step S549). The terminal device 500 then concludes the reception and writing process.

Conversely, when the MAC, UR, and signed data reception unit 541 receives the signed data 76 (Signed Data in step S543), the MAC, UR, and signed data recording unit 542 records the signed data 76 onto the recording medium device 600. Also, the content recording unit 551 records the content acquired in step S541 onto the recording medium device 600 (step S545). The terminal device then concludes the reception and recording process.

Next, the playback process by the terminal device 500 is described.

Figure 19:
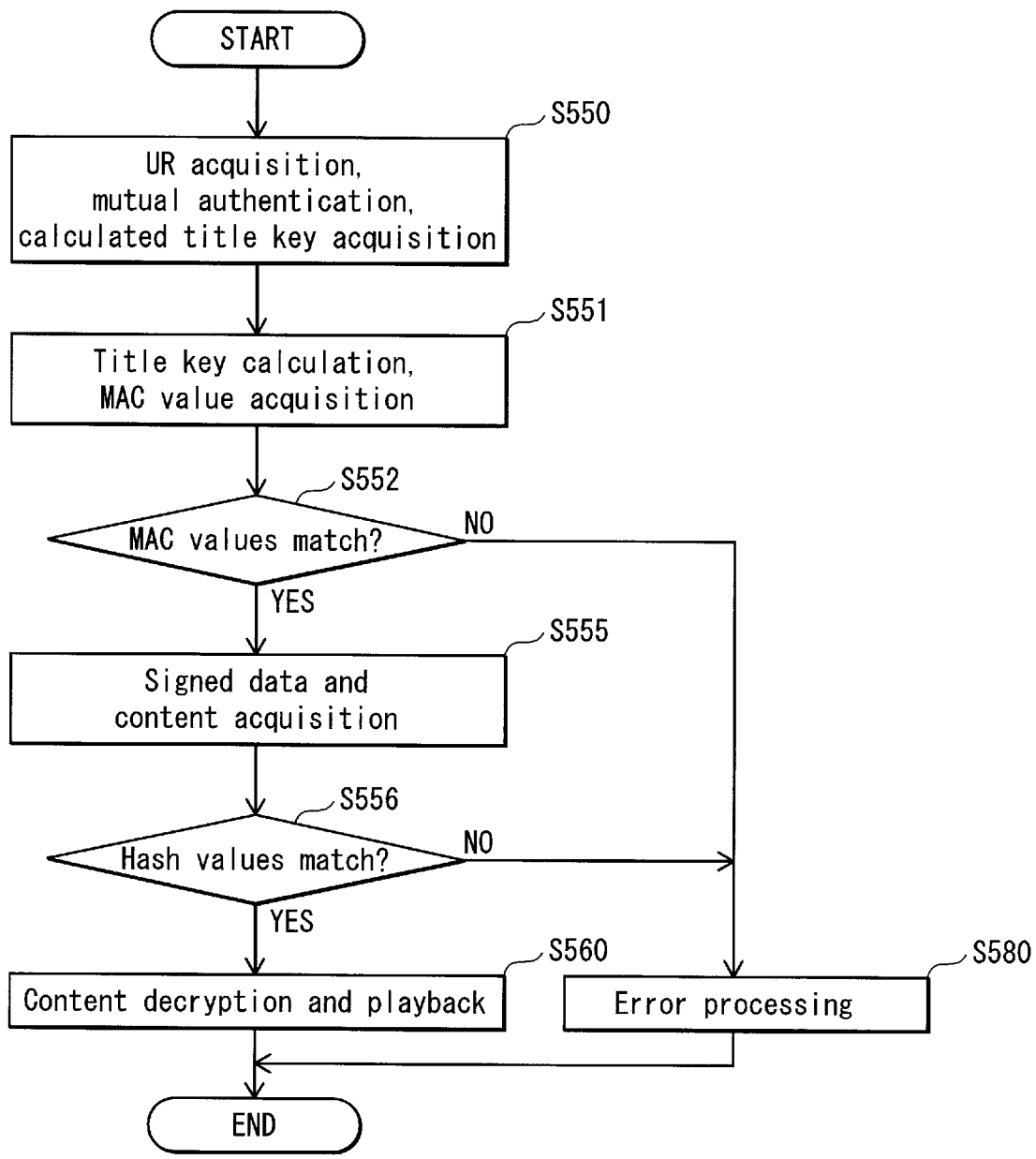
FIG. 19 is a flowchart of the playback process by the terminal device 500 pertaining to the exemplary Embodiment.

FIG. 19 is a flowchart indicating the playback process by the terminal device 500.

The playback process illustrated below begins when, for example, a playback request operation, which includes a designation of content to be played back, is received from the user of the terminal device 500.

The UR reading unit 581 of the terminal device 500 reads the UR of the content to be played back from the recording medium device 600, on which the content is recorded. The mutual authentication unit 530 performs mutual authentication with the recording medium device 600, sharing a common key therewith. Also, the title key acquisition unit 540 acquires the calculated title key from the recording medium device 600 through the encryption and decryption unit 533 (step S550).

The title key recalculation unit 546 calculates a hash value for the UR read by the UR reading unit 581, acquires the original title key by applying the simple set of reversible operations, such as XOR, to the calculated hash value and to the calculated title key acquired by the title key acquisition unit 540, and stores the original title key in the title key storage unit 545. The MAC reading unit 580 reads the MAC value corresponding to the content being read from the recording medium device 600 (step S551).

The first playback determination unit 582 uses the title key stored in the title key storage unit 545 to calculate a MAC value for the recording medium device ID acquired by the recording medium device ID acquisition unit 531, then determines whether or not the MAC value so calculated matches that of the recording medium device ID read by the MAC reading unit 580 (step S552).

When the MAC values do not match (NO in step S552), the first playback determination unit 582 prevents content playback by not permitting the content reading unit 586 to read the content. The first playback determination unit 582 also notifies the user to the effect that the content cannot be played back through a display on a television or similar output device via the content decryption unit 590 and the content playback unit 591 (step S580). The terminal device 500 then terminates the playback process.

Conversely, when the first playback determination unit 582 determines that the two MAC values match (YES in step S552), the signed data reading unit 585 reads the signed data 76 corresponding to the content from the recording medium device 600 on which the content is recorded. The content reading unit 586 reads the content to be played back from the recording medium device 600 (step S555).

The second playback determination unit 587 verifies the signature 78 of the signed data 76 read during step S555 using the root public key stored in the root public key storage unit 511 and the key distribution device public key written in the key distribution device certificate 10 received during mutual authentication with the key distribution device 400. When the signature 78 is legitimate and the content read during step S555 is divided into a plurality of portions, the second playback determination unit 587 calculates hash values for each of the content portions, then determines whether or not the hash values so calculated match the hash values (reference signs 71 through 73) in the signed data 76 (step S556).

When the hash values do not match (NO in step S556), the second playback determination unit 587 prevents content playback by not granting the content decryption unit 590 the permission to decrypt the content. The second playback determination unit 587 also notifies the user to the effect that the content cannot be played back through a display on a television or similar output device made via the content decryption unit 590 and the content playback unit 591 (step S580). The terminal device 500 then terminates the playback process. The second playback determination unit 587 may also perform step S580 when the signature 78 is found to be illegitimate in step S556. The terminal device 500 then terminates the playback process.

Conversely, when the second playback determination unit 587 determines that the hash values match (YES in step S556), the content decryption unit 590 decrypts the content read during step S555 using the original title key calculated during step S551. The content playback unit 591 plays back the content so decrypted by output to the television or similar output device (step S560). The terminal device 500 then concludes the playback device.

(Configuration of Recording Medium Device 600)

Figure 20:
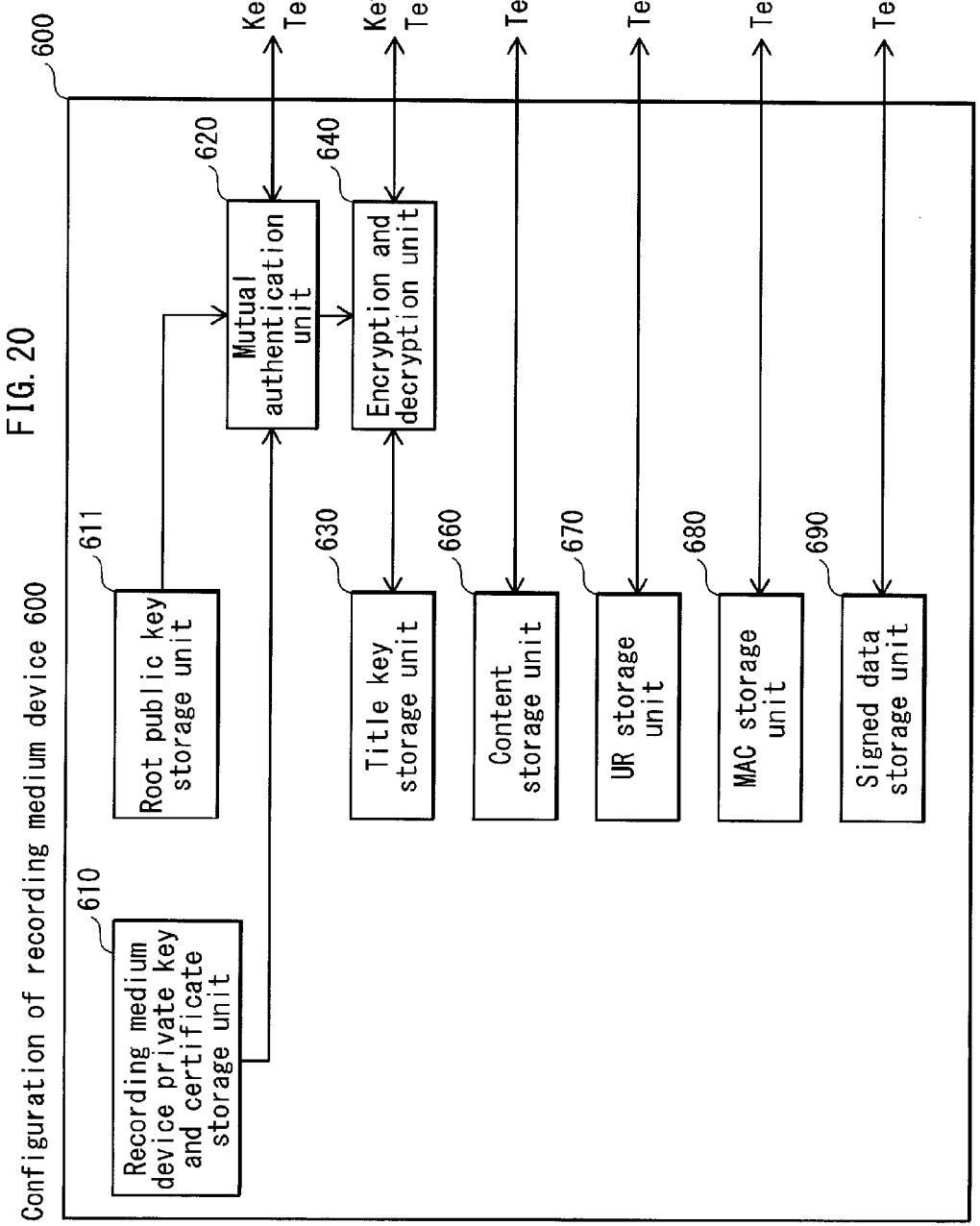
FIG. 20 is a block diagram illustrating the principal functional configuration of a recording medium device 600 pertaining to the exemplary Embodiment.

FIG. 20 is a block diagram illustrating the functional configuration of the principal components of the recording medium device 600.

As shown, the recording medium device 600 includes a recording medium device private key and certificate storage unit 610, a root public key storage unit 611, a mutual authentication unit 620, a title key storage unit 630, an encryption and decryption unit 640, a content storage unit 660, a UR storage unit 670, a MAC storage unit 680, and a signed data storage unit 690.

The recording medium device 600 includes a processor and a memory. The functions of the mutual authentication unit 620 and the encryption and decryption unit 640 are each realized by having the processor execute a program stored in the memory.

The recording medium device private key and certificate storage unit 610 is a memory area for storing a recording medium device private key and paired certificate 30. In practice, the writing of the recording medium device private key and certificate 30 to the recording medium device private key and certificate storage unit 610 is realized by a recording medium manufacturing apparatus writing the private key and certificate 30 generated by the key issuance device 200 during manufacture of the recording medium device 600. The details of the writing method for writing the recording medium device private key and certificate 30 are omitted.

The root public key storage unit 611 is a memory area for storing the root public key. In practice, the writing of the root public key to the root public key storage unit 611 is realized during manufacture of the recording medium device 600 by the recording medium manufacturing apparatus writing the root public key generated by the key issuance device 200. The details of the writing process for the root public key are omitted.

The mutual authentication unit 620 performs mutual authentication with the key distribution device 400 and with the terminal device 500, sharing a common key and exchanging certificates (the key distribution device certificate 10, the terminal device certificate 20, and the recording medium device certificate 30) therewith. The operations involved in the mutual authentication are as described above (see FIG. 12).

The title key storage unit 630 is a memory area for storing the calculated title key, and for security purposes, is not readable in a normal file system. That is, the calculated title key stored in the title key storage unit 630 is only readable by the terminal device 500 upon successful authentication by the mutual authentication unit 620.

The encryption and decryption unit 640 uses the common key generated during the mutual authentication process by the mutual authentication unit 620 to encrypt the data at transmission time and decrypt the data at reception time, and thus securely exchanges communications data with the key distribution device 400 and with the terminal device 500. Specifically, the encryption and decryption unit 640 receives, from the key distribution device 400, the calculated title key encrypted using the common key shared with the key distribution device 400 and uses the common key to decrypt title key for storage in the title key storage unit 630. Also, in response to a request from the terminal device 500, the encryption and decryption unit 640 encrypts the calculated title key stored in the title key storage unit 630 using the common key shared with the terminal device 500, and transmits the results thereto. Accordingly, the calculated title key is securely passed between the recording device 600 and both of the terminal device 500 and between the recording device 600 and the key distribution device 400.

The content storage unit 660 is a memory area for storing content. The terminal device 500 performs content reading and writing in this memory area.

The UR storage unit 670 is a memory area for storing the UR. The terminal device 500 performs UR reading and writing in this memory area.

The MAC storage unit 680 is a memory area for storing the MAC value of the recording medium device ID. The terminal device 500 performs MAC value reading and writing in this memory area.

The signed data storage unit 690 is a memory area for storing the signed data 76. The terminal device 500 performs signed data 76 reading and writing there.

(Write Process by Recording Medium Device 600)

Figure 21:
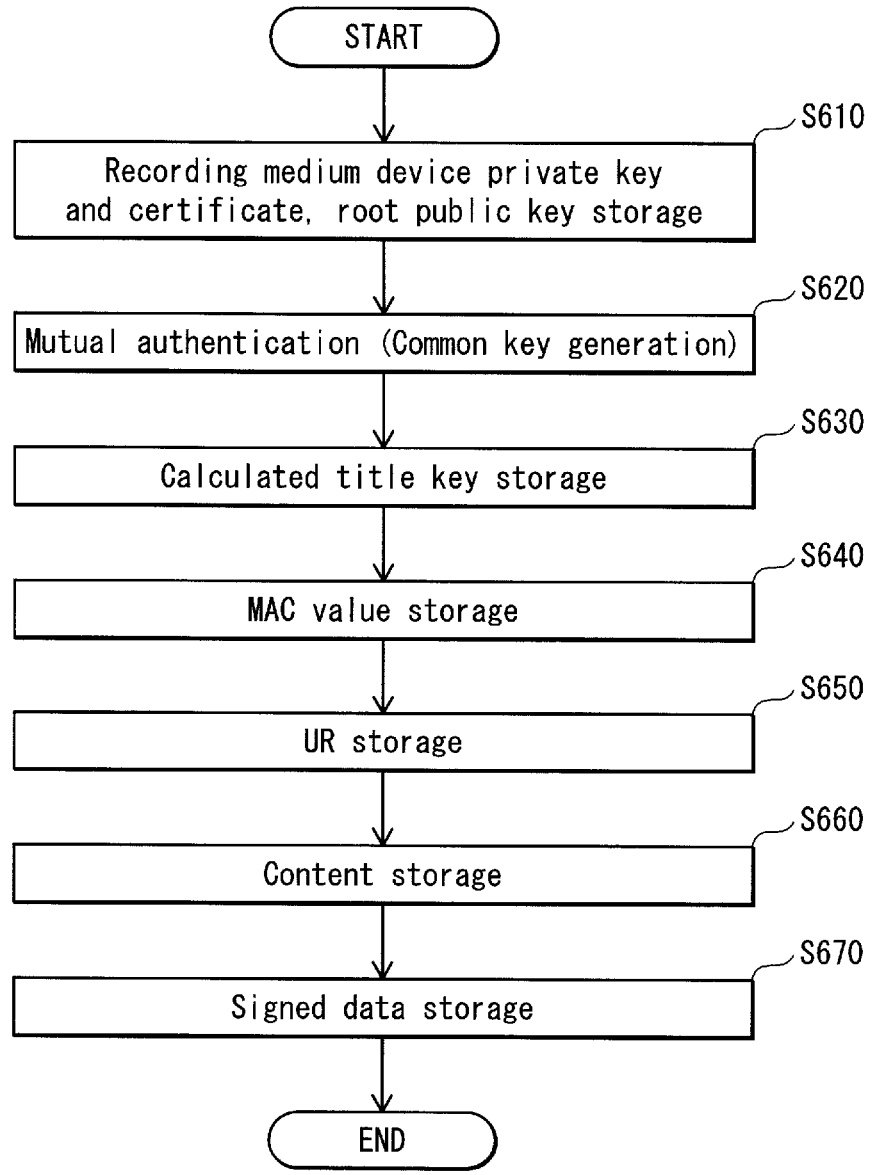
FIG. 21 is a flowchart indicating a writing process by the recording medium device 600 pertaining to the exemplary Embodiment.

FIG. 21 is a flowchart indicating the write process by the recording medium device 600.

The order of operations for the writing process made up of steps S610 through S670 is given as an example, below. No limitation is intended regarding the order of the steps. For example, provided that step S610 is complete before step S620 begins, and that step S630 is performed after step S620 is complete, steps S630 through S650 may be performed in any order. Also, the order of steps S660 and S670 may be as stated or reversed, provided that steps S660 and S670 are performed after steps S630 through S650.

While manufacturing the recording medium device 600, the recording medium manufacturing apparatus stores the recording medium device private key and certificate 30 in the recording medium device private key and certificate storage unit 610 and stores the root public key in the root public key storage unit 611 of the recording medium device 600 (step S610).

Given an access request from the key distribution device 400 or from the terminal device 500, the mutual authentication unit 620 performs mutual authentication with the requesting device to confirm that the device is trustworthy and to simultaneously generate a common key therewith. In subsequent communications, data are secured by encryption and decryption with this common key (step S620). The mutual authentication unit 620 determines whether or not the terminal device ID of the terminal device 500 included in the terminal device certificate 20 acquired during the mutual authentication process is listed in a revoke file. The revoke file is a separately transmitted and stored list of revoked devices. In the affirmative case, the mutual authentication unit 620 deems the terminal device 500 to be illegitimate, cancels all subsequent communication therewith, and concludes the writing process.

Once step S620 is complete, the encryption and decryption unit 640 receives the calculated title key from the key distribution device 400 for storage in the title key storage unit 630 (step S630).

The terminal device 500 also stores the UR in the UR storage unit 670 and the MAC value for the recording medium device ID in the MAC storage unit 680 (steps S640 and S650).

The terminal device 500 also stores the content in the content storage unit 660 and the signed data 76 in the signed data storage unit 690 (steps S660 and S670). The recording medium device 600 then concludes the writing process.

Although the reading process performed by the recording medium device 600 is not specifically illustrated, the process is performed upon receipt of an access request (read request) from the terminal device 500.

That is, the calculated title key stored in the title key storage unit 630 is read out by the terminal device 500 via the encryption and decryption unit 640 during the mutual authentication process by the mutual authentication unit 620. Also, the content stored in the content storage unit 660, the UR stored in the UR storage unit 670, the MAC value stored in the MAC storage unit 680, and the signed data 76 stored in the signed data storage unit 690 are similarly read out by the terminal device 500.

<Supplement>

(1) In the exemplary Embodiment, the recording medium device 600 is described as an SD card or similar memory card. This is intended as an example. For example, the recording medium device 600 may be an HDD (Hard Disk Drive) or similar storage device incorporating a control LSI (Large Scale Integration) in any device, such as a mobile phone, a proprietary terminal for viewing eBooks, or another mobile device in which the memory device is incorporated and that is not a removable memory card.

(2) In the exemplary Embodiment, data communication between the terminal device 500 and the key distribution device 400, between the terminal device 500 and the recording medium device 600, and between the key distribution device 400 and the recording medium device 600 involves protection using a common key shared during mutual authentication. However, this is intended as an example. Rather than using the common key for data protection, a secure communication technology such as HTTPS (Hypertext Transfer Protocol over Secure Socket Layer) may be used.

(3) In the above-described exemplary Embodiment, the terminal device 500 performs transmission. However, no limitation is intended thereby. Rather than having the terminal device 500 perform transmission, the key distribution device 400 or the recording medium device 600 may be instructed to perform transmission by a terminal device other than the terminal device 500, and thus be configured to perform data transmission.

(4) In the exemplary Embodiment, the first playback determination unit 582 of the terminal device 500 uses the MAC value for the recording medium device ID of the recording medium device 600 to determine whether to perform or prevent content playback. However, this is intended as an example. The calculated title key may also be used, for example. Specifically, when the calculated title key has been obtained by applying an XOR operation to the title key and to the hash value of the UR, an additional XOR operation may be applied to the calculated title key and the recording medium device ID of the recording medium device 600 or to the hash value thereof, and the result of the XOR operation may then be used. Alternatively, the key issuance device 200 or the key distribution device 400 may simply sign the recording medium device ID of the recording medium device 600, and the first playback determination unit 582 may then verify the signature to determine whether to perform or prevent content playback.

(5) In the exemplary Embodiment, the signature unit 152 of the content production device 100 applies a signature to the content ID in order to prevent tampering therewith. However, the signature by the signature unit 152 may also be accompanied or replaced with a signature by the key issuance device 200.

(6) In the exemplary Embodiment, the terminal device 500 is a DVD or BD player, and the content produced by the content production device 100 is distributed to the terminal device 500 via a recording medium such as a BD. However, the content produced by the content production device 100 may also be modified for distribution to the terminal device 500 over the Internet. Specifically, a variant of the content distribution system 1000 described in the Embodiment may further include a content distribution device. In this variant, the terminal device 500 is not limited to a DVD or BD player but may also be a personal computer capable of connecting to the Internet. The content produced by the content production device 100 is then registered by the content distribution device and distributed to the terminal device 500 by a method such as streaming over the Internet or being downloaded from the content distribution device.

(7) As described in the exemplary Embodiment, when, as shown in FIG. 9, the authentication of the writeout authentication request data 40 from the terminal device 500 is successful (YES in step S330), the content distribution authentication device 300 generates the authentication ID for transmission to the terminal device 500 (step S340), and transmits the authentication ID and paired UR to the key distribution device 400 (step S350).

However, the authentication ID may be generated in advance rather than during step S340, and such a pre-generated authentication ID may then be transmitted in steps S340 and S350. Also, in variation (6) described above, the content distribution authentication device 300 may perform steps S340 and S350 every time the content is downloaded.

When this variation is employed, the timing of authentication ID and UR reception in step S420 of the pre-distribution process performed by the key distribution device 400 indicated in FIG. 14 may be modified to match.

(8) In the exemplary Embodiment, the position designation information generated by the position designation unit 460 of the key distribution device 400 is information indicating the position and size of a content portion subject to hash value comparison by the verification unit 462, taken from the content that the terminal device 500 is attempting to write onto the recording medium device 600.

However, the position designation information may also designate the position and size of each of a plurality of such portions, as content portions subject to hash value comparison. In other words, the content portion may be made up of a plurality of portions of the content that the terminal device 500 is attempting to write to the recording medium device 600.

Also, the position designation information is not limited to indicating a portion of the content that the terminal device 500 is attempting to write onto the recording medium device 600, and may alternatively indicate the entirety of such content.

(9) In the exemplary Embodiment, when the MAC values do not match, the first playback determination unit 582 of the terminal device 500 inhibits content playback by not permitting the content reading unit 586 to read the content. However, the first playback determination unit 582 may also inhibit content playback by not permitting the content decryption unit 590 to decrypt the content, or by not permitting the content playback unit 591 to decode or output the content to the output device.

Also, in the exemplary Embodiment, when the hash values do not match, the second playback determination unit 587 of the terminal device 500 inhibits content playback by not permitting the content decryption unit 590 to decrypt the content. However, the second playback determination unit 587 may also inhibit content playback by not permitting the content playback unit 591 to decode or output the content to the output device.

(10) As described in the exemplary Embodiment, the title key storage unit 630 of the recording medium device 600 stores the calculated title key. However, the raw, uncalculated title key for the key distribution device 400 generated by the title key generation unit 450 may also be transmitted to the recording medium device 600, such that the recording medium device 600 stores the raw title key (the key distribution device, terminal device, and recording medium device pertaining to this variation are hereinafter respectively termed the variant key distribution device, the variant terminal device, and the variant recording medium device).

Figure 25:
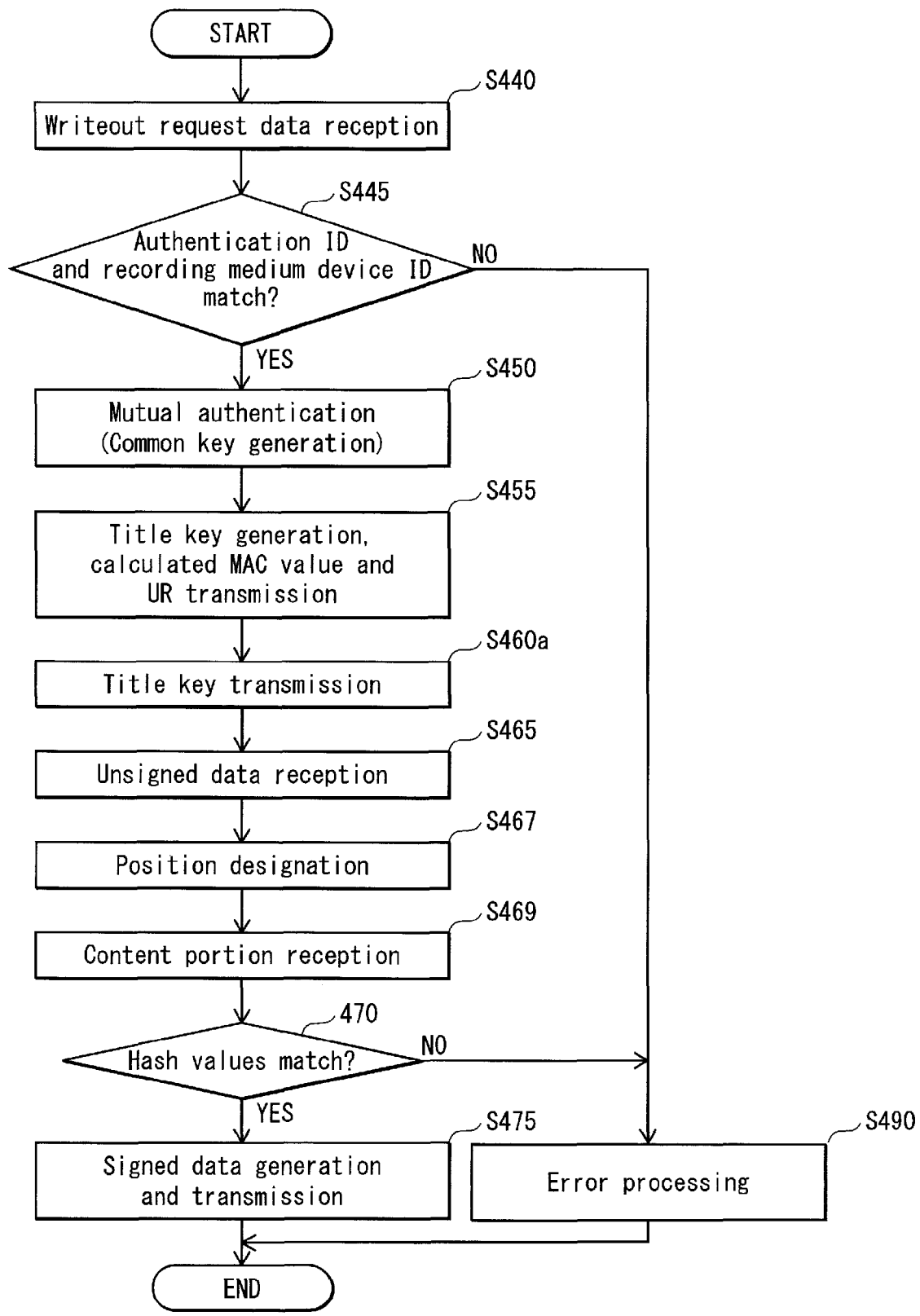
FIG. 25 is a flowchart indicating a distribution process by a key distribution device pertaining to a variant Embodiment.

Specifically, as indicated in FIG. 25, the variant key distribution device replaces step S460 of the process performed by the key distribution device 200 and indicated in FIG. 15 with step S460a. That is, the title key transmission unit of the variant key distribution device transmits the title key generated by the title key generation unit 450 to the recording medium device 600 via the encryption and decryption unit 455 (step S460a).

Figure 26:
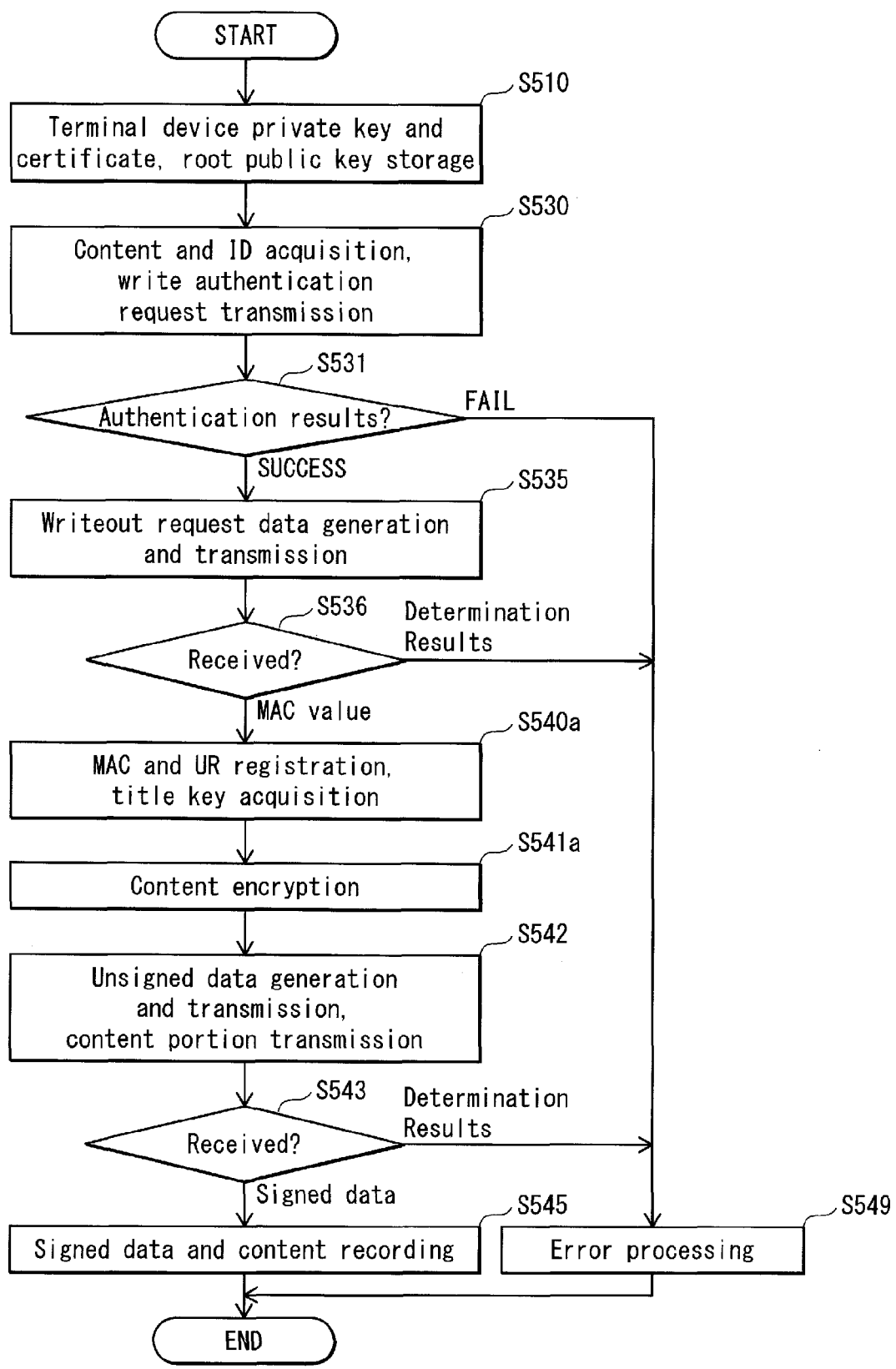
FIG. 26 is a flowchart of the reception and writing process by a terminal device pertaining to the variant Embodiment.

Also, as shown in FIG. 26, the variant terminal device replaces steps S540 and S541 of the process performed by the terminal device 500 and indicated in FIG. 18 with steps S540a and S541a. In other words, the MAC, UR, and signed data recording unit 542 of the variant terminal device records the MAC value and UR output by the MAC, UR, and signed data reception unit 541 to the recording medium device 600. Further, the title key acquisition unit of the variant terminal device acquires the title key from the recording medium device 600 via the encryption and decryption unit 533 (step S540a) for storage in the title key storage unit 545. Also, the encryption unit 550 encrypts the plain-text content acquired by the content acquisition unit 220 using the title key stored in the title key storage unit 545 (step S541a).

Figure 27:
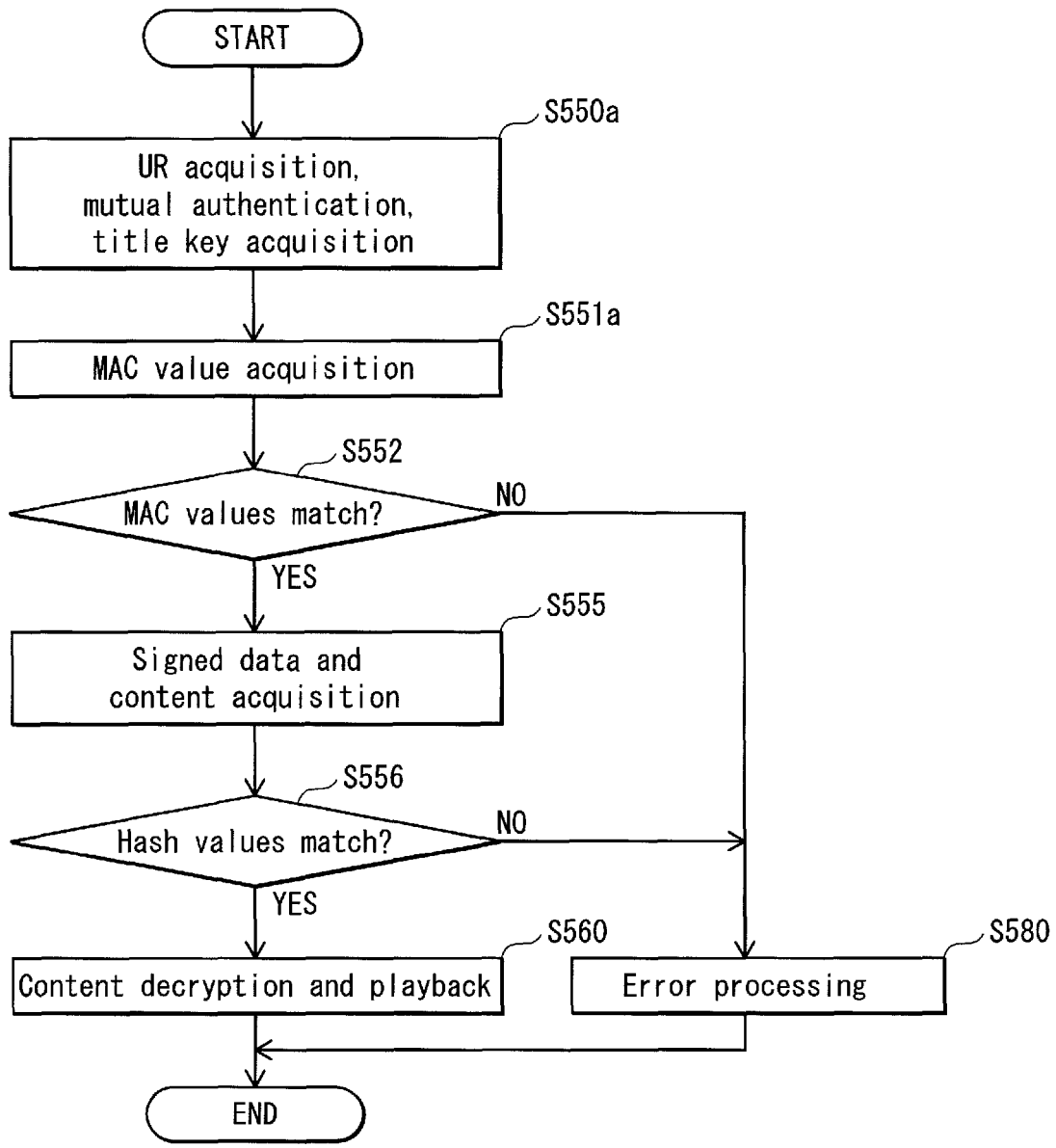
FIG. 27 is a flowchart of the playback process by the terminal device pertaining to the variant Embodiment.

Also, as shown in FIG. 27, the variant terminal device replaces steps S550 and S551 of the process performed by the terminal device 500 and indicated in FIG. 19 with steps S550a and S551a. That is, the title key acquisition unit of the variant terminal device acquires the title key from the recording medium device 600 via the encryption and decryption unit 533 for storage in the title key storage unit 545 (step S550a). Also, the MAC reading unit 580 reads the MAC value corresponding to the content to be played back from the recording medium device 600 (step S551a).

Figure 28:
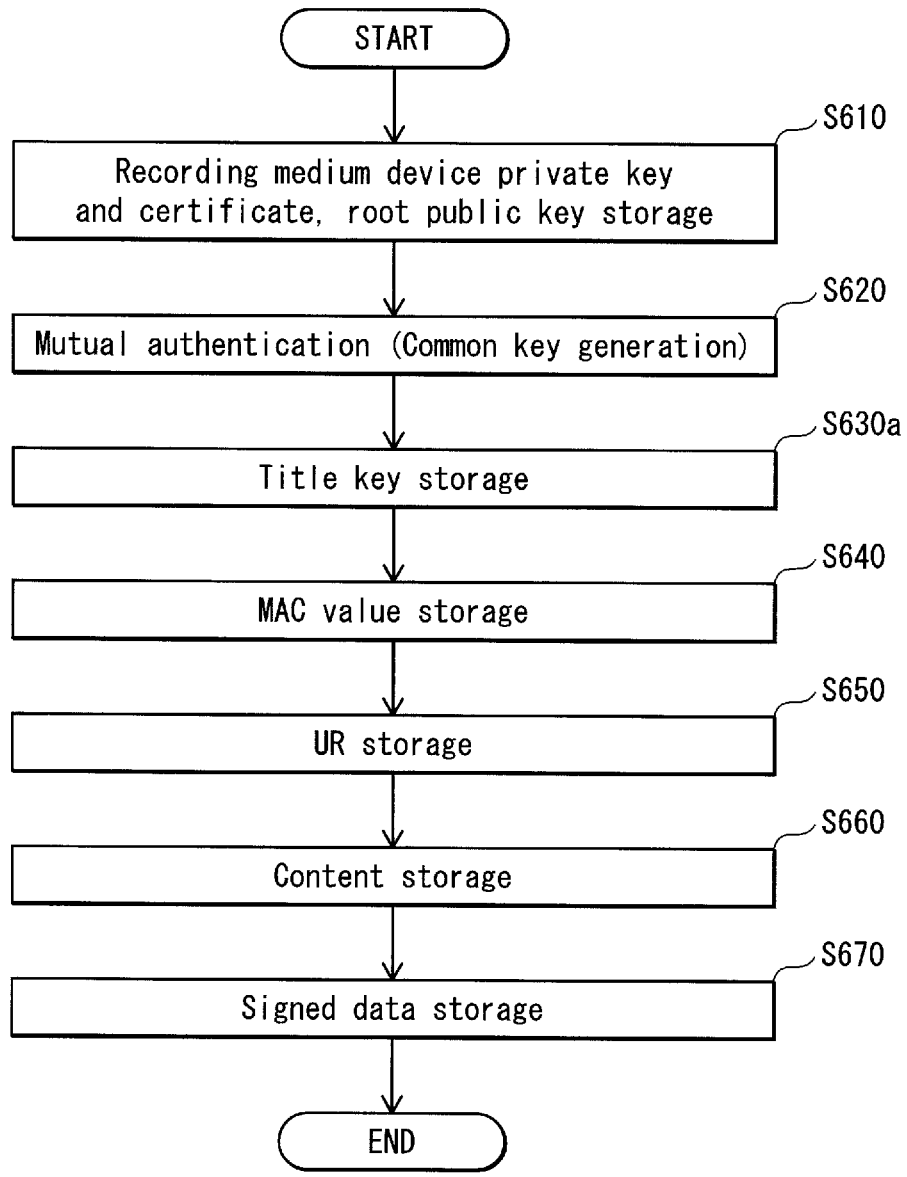
FIG. 28 is a flowchart indicating a writing process by a recording medium device pertaining to the variant Embodiment.

Further, as shown in FIG. 28, the variant recording medium device replaces step S630 of the process performed by the recording medium device 600 and indicated in FIG. 21 with step S630a. That is, the encryption and decryption unit 640 of the variant recording medium device receives the title key from the key distribution device 400 for storage in the title key storage unit 630 (step S630a).

(11) Each component described in the exemplary Embodiment may be realized in whole or in part as an integrated circuit on a single chip or on multiple chips, or may be realized as a computer program or in some other manner.

Also, the components described in the exemplary Embodiment realize the effects thereof in cooperation with the processor of the device in which each respective component is included (i.e., the content production device 100, the key issuance device 200, the content distribution authentication device 300, the key distribution device 400, the terminal device 500, and the recording medium device 600).

(12) A program for causing the processor to run the devices described in the exemplary Embodiment (i.e., the content production device 100, the key issuance device 200, the content distribution authentication device 300, the key distribution device 400, the terminal device 500, and the recording medium device 600) (see FIGS. 3, 6, 9, 14, 15, 18, 19, and 21) may be recorded on a recording medium or distributed through various types of communication lines. The recording medium may be an IC card, a hard disk, an optical disc, a floppy disc, ROM, flash memory, or similar. The program so distributed is provided for use by storage in processor-readable memory in the relevant device. The processor realizes the functions of the device (i.e., the content production device 100, the key issuance device 200, the content distribution authentication device 300, the key distribution device 400, the terminal device 500, and the recording medium device 600), as described in the Embodiment, by having the processor execute the relevant program.

(13) Variations (1) through (12), described above, may be applied to the entirety of or to a subset of the devices making up the content distribution system 1000 pertaining to the exemplary Embodiment.

(14) A variant configuration for the content recording control system, server device, and terminal device is described below, along with the effects thereof, as a variant Embodiment of the present disclosure.

Figure 22:
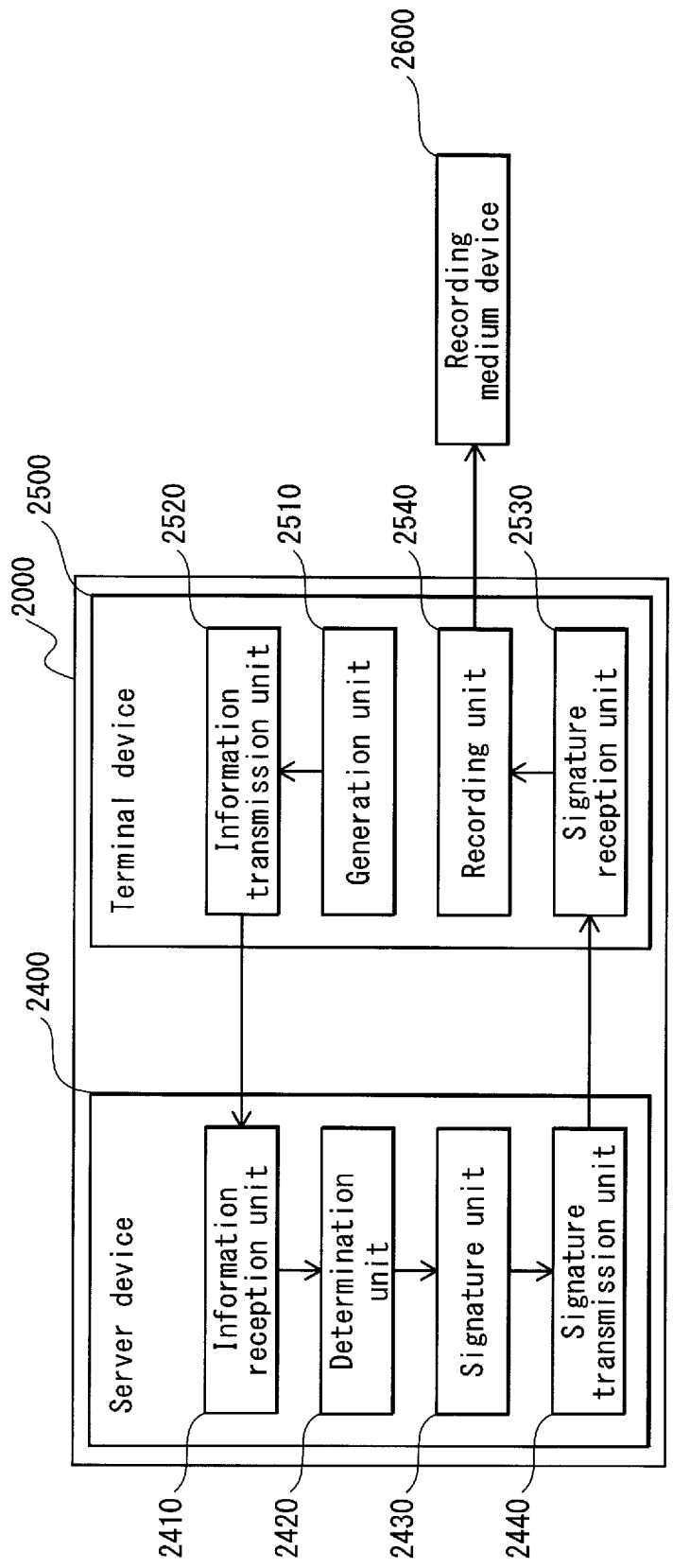
FIG. 22 is a block diagram illustrating the configuration of a server device 2400 and a terminal device 2500 in a content recording control system 2000 pertaining to another exemplary Embodiment of the invention.

(a) As shown in FIG. 22, a terminal device 2500 pertaining to a non-limiting aspect of the present disclosure records content onto a recording medium device 2600, a permission to record the content onto the recording medium device 2600 being granted by a server device 2400, the terminal device 2500 comprising: a generation unit 2510 generating a value calculated so as to represent subject content for which a permission to record onto the recording medium device 2600 is requested; an information transmission unit 2520 requesting the permission from the server device 2400 to record the subject content onto the recording medium device 2600 by transmitting information indicating the value generated by the generation unit 2510 to the server device 2400; a signature reception unit 2530 receiving subject content signature data from the server device 2400, the subject content signature data being transmitted by the server device 2400 upon granting the permission to record the subject content onto the recording medium device 2600; and a recording unit 2540 recording the subject content onto the recording medium device 2600 as one of plain-text data and encrypted data, as well as the subject content signature data received by the signature reception unit 2530.

The server device 2400, the terminal device 2500, and the recording medium device 2600 correspond, for example, to the key distribution device 400, the terminal device 500, and the recording medium device 600 of the exemplary Embodiment. Also, the generation unit 2510 corresponds to the hash calculation and unsigned data generation unit 560 of the exemplary Embodiment, while the information transmission unit 2520 corresponds to the unsigned data and content transmission unit 561 of the exemplary Embodiment, for example. Further, for example, the signature reception unit 2530 corresponds to the MAC, UR, and signed data reception unit 541 of the Embodiment, while the recording unit 2540 corresponds to the MAC, UR, and signed data recording unit 542 combined with the content recording unit 551 of the exemplary Embodiment.

The terminal device 2500 records the subject content to the recording medium device 2600 once the server device 2400 grants the permission to record the content onto the recording medium device 2600. Thus, the recording of content for which no permission to record onto the recording medium device 2600 has been granted, such as illegitimately duplicated content, is inhibited.

Also, the terminal device 2500 records the signed data transmitted by the server device 2400 onto the recording medium device 2600, as well as the content. Accordingly, a legitimate playback device is controlled so as to not play back content having no signed data recorded therewith. Thus, content hypothetically recorded onto the recording medium device by a hacked terminal device 2500 without receiving the permission from the server device 2400 is not permitted to be played back.

(b) Also, the generation unit optionally generates a hash value for the subject content to serve as the value.

The terminal device transmits information indicating the hash value of the subject content. Thus, the server device is able to specify the subject content for which permission to record onto the recording medium device is requested. This is based on the fact that different content will normally result in a different hash value.

(c) Also, optionally, the generation unit generates the hash value for each of a plurality of content portions making up the subject content, and upon receipt of designation information designating one or more of the content portions, the information transmission unit further transmits each designated content portion to the server device as designated by the designation information transmitted by the server device in order to determine whether or not to grant the permission.

The terminal device transmits a portion of the subject content to the server device as indicated in designation information received from the server device. Accordingly, the server device determines whether or not to grant the permission to record the subject content onto the recording medium device by calculating a hash value from the portion of the subject content, matching the calculated hash value with the hash value for the subject content received from the terminal device, and making the determination in accordance with the results.

(d) Optionally, the data recorded onto the recording medium device by the recording unit result from encryption of the subject content using a title key for the subject content.

The terminal device encrypts the subject content using the title key thereof prior to recording onto the recording medium device. The subject content is thus protected.

(e) As shown in FIG. 22, a server device 2400 pertaining to a non-limiting aspect of the present disclosure determines whether or not to grant to a terminal device 2500 a permission to record content onto a recording medium device 2600, the server device 2400 comprising: an information reception unit 2410 receiving information from the terminal device 2500, the information indicating a value calculated so as to represent subject content for which a permission to record onto the recording medium device 2600 is requested; a determination unit 2420 determining whether or not to grant the permission to record the subject content onto the recording medium device 2600 depending on the value indicated in the information received by the information reception unit 2410; a signature unit 2430 generating subject content signature data when the determination unit 2420 grants the permission to record; and a signature transmission unit 2440 transmitting the subject content signature data generated by the signature unit 2430 to the terminal device 2500.

The information reception unit 2410 corresponds to the unsigned data and content reception unit 461 of the exemplary Embodiment, while the determination unit 2420 corresponds to the verification unit 462 of the exemplary Embodiment, for example. Also, the signature unit 2430 corresponds to the signature unit 470 of the exemplary Embodiment, while the signature transmission unit 2440 corresponds to the signed data transmission unit 471 of the exemplary Embodiment, for example.

The server device 2400 determines whether or not to grant the permission to record the subject content onto the recording medium device 2600 according to the information indicating the value calculated so as to represent the subject content. Accordingly, the server device 2400 is able to identify the subject content for which the permission to record onto the recording medium device 2600 has been granted.

When permission to record the subject content onto the recording medium device 2600 is granted, signed data for the subject content are generated and transmitted to the terminal device 2500. Accordingly, a legitimate playback device is controlled so as to not play back content having no signed data recorded therewith. Thus, content hypothetically recorded onto the recording medium device by a hacked terminal device 2500 without receiving the permission from the server device 2400 is not permitted to be played back.

(f) Optionally, the information received by the information reception unit indicates hash values each calculated for one of a plurality of content portions making up the subject content, the server device further comprises a designation unit generating designation information and transmitting the designation information to the terminal device, the designation information designating one or more of the content portions to be transmitted by the terminal device upon receipt of the information by the information reception unit, the information reception unit further receives each designated content portion transmitted by the terminal device in response to the designation information transmitted by the designation unit, and the determination unit determines whether or not matching occurs between: a designated hash value of the portion designated in the designation information generated by the designation unit, among the hash values in the information received by the information reception unit, and a calculated hash value for the designated content portion received by the information reception unit, and grants the permission to record the subject content onto the recording medium device upon matching.

The designation unit corresponds to the position designation unit 460 of the exemplary Embodiment.

The server device calculates a hash value for the designated portion of the subject content, and grants the permission to record the subject content onto the recording medium device when matching occurs between the calculated hash value and the hash value of the portion as indicated in the information received from the terminal device. Accordingly, an unwanted situation, such as recording content onto the recording medium device by exchanging the content on the terminal device, is prevented from occurring.

(g) Optionally, the designation unit generates position information indicating a position within the subject content for at least one randomly-selected content portion among the content portions making up the subject content for use as the designation information.

The server device randomly selects the content portion. Accordingly, an unwanted situation, such as recording content onto the recording medium device by partially exchanging the content on the terminal device, is prevented from occurring.

(h) Optionally, the server device further comprises an authentication information reception unit receiving authentication information transmitted to the server device and to the terminal device from an authentication device upon authenticating the subject content as being pre-registered, in response to a request from the terminal device; a title key generation unit generating one of a plain-text title key and an encrypted title key for the subject content upon receipt of authentication information transmitted by the terminal device that matches the authentication information received by the authentication information reception unit, the key being used by the terminal device when recording the subject content onto the recording medium device as encrypted data; and a title key transmission unit transmitting one of the title key generated by the title key generation unit and a calculated title key generated by applying a predetermined operation to the title key to the recording medium device for recording.

The authentication device corresponds, for example, to the content distribution authentication device 300 of the exemplary Embodiment. Also, for example, the authentication information reception unit corresponds to the authentication ID and UR reception unit 421 of the exemplary Embodiment, the title key generation unit corresponds to the title key generation unit 450 of the exemplary Embodiment, and the title key transmission unit corresponds to the title key transmission unit 454 of the exemplary Embodiment.

When the subject content is authenticated by the authentication device as being pre-registered, the server device generates the title key and records the title key, or a calculated title key calculated therefrom, onto the recording medium device. Accordingly, the terminal device encrypts the subject content using the title key or the calculated title key prior to recording onto the recording medium device. As such, the server device prevents the recording of subject content onto a recording medium where the title key or the calculated title key has not been recorded.

(i) As shown in FIG. 22, a content recording control system pertaining to a non-limiting aspect of the present disclosure comprises: a server device 2400 determining whether or not to grant a permission to record content onto a recording medium device 2600; and a terminal device 2500 recording the content onto the recording medium device 2600, the permission to record the content onto the recording medium device 2600 being granted by the server device 2400, the terminal device 2500 comprising: a generation unit 2510 generating a value calculated so as to represent subject content for which a permission to record onto the recording medium device 2600 is requested; an information transmission unit 2510 requesting the permission from the server device 2400 to record the subject content onto the recording medium device 2600 by transmitting information indicating the value generated by the generation unit 2510 to the server device 2400; a signature reception unit 2530 receiving subject content signature data from the server device 2400, the subject content signature data being transmitted by the server device 2400 upon granting the permission to record the subject content onto the recording medium device 2600; and a recording unit 2540 recording the subject content onto the recording medium device 2600 as one of plain-text data and encrypted data, as well as the subject content signature data received by the signature reception unit 2530, and the server device 2400 comprising: an information reception unit 2410 receiving the information transmitted by the terminal device 2500; a determination unit 2420 determining whether or not to grant the permission to record the subject content onto the recording medium device 2600 depending on the value indicated in the information received by the information reception unit 2410; a signature unit 2430 generating subject content signature data when the determination unit 2420 grants the permission to record; and a signature transmission unit 2440 transmitting the subject content signature data generated by the signature unit 2430 to the terminal device 2500.

The terminal device 2500 of the content recording control system 2000 records the subject content onto the recording medium device 2600 once the server device 2400 grants the permission to record the content onto the recording medium device 2600. Thus, the recording of content for which no permission to record onto the recording medium device 2600 has been granted, such as illegitimately duplicated content, is inhibited.

Also, the terminal device 2500 records the signed data transmitted by the server device 2400, as well as the subject content, onto the recording medium device 2600. Accordingly, a legitimate playback device is controlled so as to not play back content having no signed data recorded therewith. Thus, subject content hypothetically recorded onto the recording medium device by a hacked terminal device 2500 without receiving the permission from the server device 2400 is prevented from being played back.

Also, the server device 2400 of the content recording control system 2000 determines whether or not to permit recording of the subject content onto the recording medium device 2600 according to the information indicating a value calculated so as to represent the composition of the subject content. Accordingly, the server device 2400 is able to identify the subject content for which the permission to record onto the recording medium device 2600 has been granted.

Figure 23:
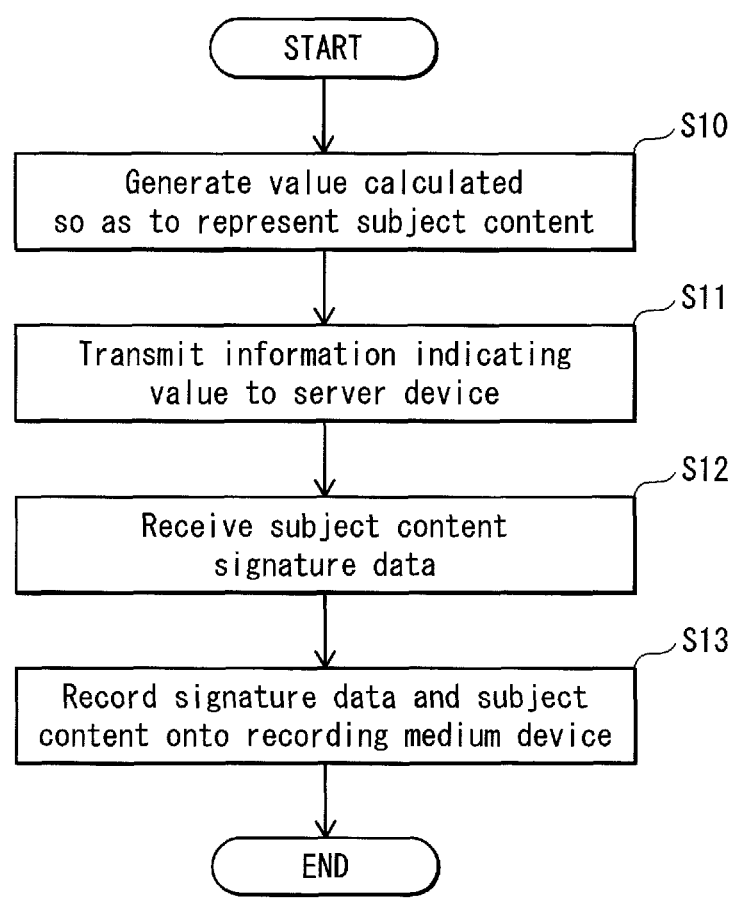
FIG. 23 is a flowchart of a recording method pertaining to the other exemplary Embodiment of the invention.

(j) As shown in FIG. 23, a recording method pertaining to a non-limiting aspect of the present disclosure is used by a terminal device recording content onto a recording medium device, a permission to record the content onto the recording medium device being granted by a server device, the recording method comprising: a generation step S10 of generating a value calculated so as to represent subject content for which a permission to record onto the recording medium device is requested; an information transmission step S11 of requesting the permission from the server device to record the subject content onto the recording medium device by transmitting information indicating the value generated in the generation step S10 to the server device; a signature reception step S12 of receiving subject content signature data from the server device, the subject content signature data being transmitted by the server device upon granting the permission to record the subject content onto the recording medium device; and a recording step S13 of recording the subject content onto the recording medium device as one of plain-text data and encrypted data, as well as the subject content signature data received in the signature reception step S12.

The processes of the generation step S10 and the information transmission step Si 1 correspond to the generation of the unsigned data and the subsequent transmission process indicated in step S542 of FIG. 18, for example. Also, the processes of the signature reception step S12 and the recording step S13 correspond to the reception determination process of step S453 and the signed data and content recording process of step S545, indicated in FIG. 18, for example.

According to this recording method, the terminal device records the subject content onto the recording medium device once the server device grants the permission to record the content onto the recording medium device. Thus, the recording of content for which no permission to record onto the recording medium device has been granted, such as illegitimately duplicated content, is inhibited.

Also, according to this recording method, the terminal device records the signed data transmitted by the server device, as well as the subject content, onto the recording medium device. Accordingly, a legitimate playback device is controlled so as to not play back content having no signed data recorded therewith. Thus, subject content hypothetically recorded onto the recording medium device by a hacked terminal device without receiving permission from the server device is prevented from being played back.

Figure 24:
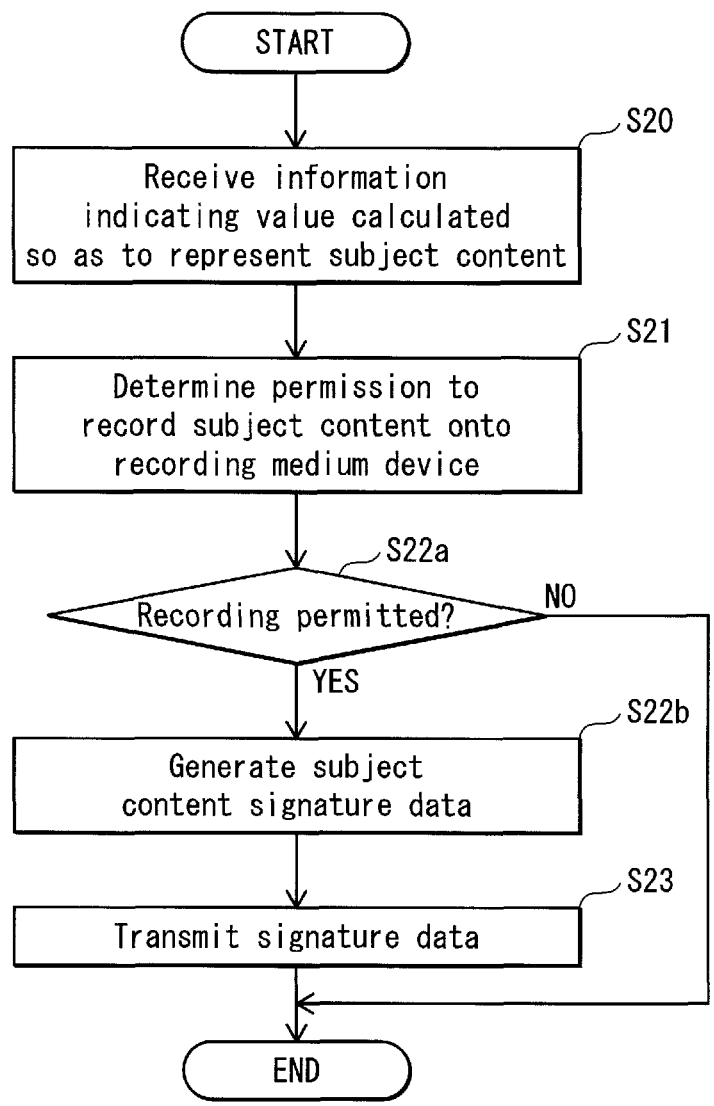
FIG. 24 is a flowchart of a recording permission control method pertaining to the other exemplary Embodiment of the invention.

(k) As shown in FIG. 24, a recording permission control method pertaining to a non-limiting aspect of the present disclosure is used by a server device determining whether or not to grant to a terminal device a permission to record content onto a recording medium device, the recording permission control method comprising: an information reception step S20 of receiving information from the terminal device, the information indicating a value calculated so as to represent subject content for which a permission to record onto the recording medium device is requested; a determination step S21 of determining whether or not to grant the permission to record the subject content onto the recording medium device depending on the value indicated in the information received in the information reception step; a signature step S22b of generating subject content signature data when the permission to record is granted in the determination step (YES in step S22a); and a signature transmission step S23 of transmitting the subject content signature data generated in the signature step S22b to the terminal device.

The process of the data reception step S20 corresponds to the unsigned data reception process of step S465 indicated in FIG. 15, while the process of the determination step S21 corresponds to the hash value determination process of step S470 also indicated in FIG. 15, for example. Further, the processes of the signature step S22b and of the signature transmission step S23 correspond to the signed data generation and transmission process of step S475 indicated in FIG. 15.

According to this recording permission control method, the server device determines whether or not to permit the recording of the subject content onto the recording medium device according to the information indicating a value calculated so as to represent the subject content. Accordingly, the server device is able to identify the subject content for which the permission to record onto the recording medium device has been granted.

When permission to record the subject content onto the recording medium device is granted, signed data for the subject content are generated and transmitted to the terminal device. As such, according to this recording permission control method, a legitimate playback device is controlled so as to not play back content having no signed data recorded therewith. Thus, subject content hypothetically recorded onto the recording medium device by a hacked terminal device without the permission from the server device is prevented from being played back.

INDUSTRIAL APPLICABILITY

The terminal device of the present disclosure is applicable to inhibiting the recording of illegitimately duplicated content and the like onto a recording medium device.

REFERENCE SIGNS LIST

100 Content production device
200 Key issuance device
300 Content distribution authentication device
400 Key distribution device
421 Authentication ID and UR reception unit
450 Title key generation unit
454 Title key transmission unit
460 Position designation unit
461 Unsigned data and content reception unit
462 Verification unit
470 Signature unit 471 Signed data transmission unit
500 Terminal device
560 Hash calculation and unsigned data generation unit
541 MAC, UR, and signed data reception unit
542 MAC, UR, and signed data recording unit
551 Content recording unit
561 Unsigned data and content transmission unit
600 Recording medium device
1000 Content distribution system

The invention claimed is:

1. A terminal device outputting content recorded on a recording medium device, the terminal device comprising:
a reading unit reading, from the recording medium device, content subject to output, signature data for the content, and a title key, the signature data including a hash value for each of a plurality of content pieces, a position of each of the content pieces, and a size of each of the content pieces;
a determination unit calculating the hash value for each of the content pieces, determining whether calculated results match the hash value in the signature data for each of the content pieces, and preventing playback of the content when there is no match;
a decrypting unit decrypting the content with use of the title key; and
an output unit outputting decrypted content.

2. The terminal device of claim 1, wherein
the determination unit performs verification of the signature data read from the recording medium device and, when the signature data is valid, calculates the hash value for each of the content pieces with use of the position and the size of each of the content pieces in the signature data.

3. The terminal device of claim 1, wherein,
the title key read from the recording medium device by the reading unit is a calculated title key obtained by applying a reversible operation to an original title key used to encrypt the content,
the reading unit acquires a usage rule from the recording medium device, and
the decrypting unit applies the reversible operation to the calculated title key and calculates the original title key with the usage rule, and decrypts the content using the original title key.

4. A control method used by a terminal device outputting content recorded on a recording medium device, comprising:
reading, from the recording medium device, content subject to output, signature data for the content, and a title key, the signature data including a hash value for each of a plurality of content pieces, a position of each of the content pieces, and a size of each of the content pieces;
calculating the hash value for each of the content pieces, determining whether calculated results match the hash value in the signature data for each of the content pieces, and preventing playback of the content when there is no match;
decrypting the content with use of the title key; and
outputting decrypted content.

5. The control method of claim 4, wherein
verification is performed on the signature data read from the recording medium device and, when the signature data is valid, the hash value for each of the content pieces is calculated with use of the position and the size of each of the content pieces in the signature data.

6. The control method of claim 4, wherein,
the title key read from the recording medium device is a calculated title key obtained by applying a reversible operation to an original title key used to encrypt the content,
a usage rule is acquired from the recording medium device, and
the reversible operation is applied to the calculated title key to calculate the original title key with the usage rule, and the content is decrypted using the original title key.

* * * * *